US012736920B2

(12) United States Patent
Bonke

(10) Patent No.: US 12,736,920 B2
(45) Date of Patent: Sep. 15, 2026

(54) TIME-MEASURING DEVICE

(71) Applicant: REALIZATION DESAL AG, Oberwil bei Zug (CH)

(72) Inventor: Michael Bonke, Oberwil bei Zug (CH)

(73) Assignee: Realization Desal AG, Oberwil bei Zug (CH)

( * ) Notice: Subject to any disclaimer, the term of this patent is extended or adjusted under 35 U.S.C. 154(b) by 233 days.

(21) Appl. No.: 18/701,182

(22) PCT Filed: Nov. 14, 2022

(86) PCT No.: PCT/EP2022/081832
§ 371 (c)(1),
(2) Date: Apr. 12, 2024

(87) PCT Pub. No.: WO2023/088847
PCT Pub. Date: May 25, 2023

(65) Prior Publication Data

US 2024/0419128 A1 Dec. 19, 2024

(30) Foreign Application Priority Data

Nov. 16, 2021 (DE) ........................ 102021129880.6

(51) Int. Cl.
*G04G 3/00* (2006.01)

(52) U.S. Cl.
CPC ..................................... *G04G 3/00* (2013.01)

(58) Field of Classification Search
CPC ... G04F 13/02; G04F 5/02; G04F 5/00; G04F 5/14; G04G 3/00
See application file for complete search history.

(56) References Cited

U.S. PATENT DOCUMENTS 3,552,116 A 1/1971 Sidell et al.
4,482,259 A 11/1984 Facklam
(Continued)

FOREIGN PATENT DOCUMENTS

CN 101002082 A 7/2007
CN 111943486 A 11/2020
(Continued)

OTHER PUBLICATIONS

PCT/EP2022/081832, International Search Report dated Feb. 10, 2023, 3 pgs.
(Continued)

*Primary Examiner* — Sean Kayes
(74) *Attorney, Agent, or Firm* — LOZA & LOZA, LLP; David S. Sarisky

(57) ABSTRACT

The invention relates to a timepiece, in particular a wristwatch, comprising an electro-optical converter device with at least one electro-optical converter, an opto-electric converter device, a first signal path which leads into the opto-electric converter device via a first waveguide, a second signal path which leads into the opto-electric converter device directly or via a second waveguide, a control device, and a useful-signal generating device. The first signal path and the second signal path are designed such that the propagation time of the first clocked light signal in the first signal path and the propagation time of the second clocked light signal in the second signal path differ from each other.

15 Claims, 13 Drawing Sheets

(56) References Cited

U.S. PATENT DOCUMENTS

| | | | | |
|---|---|---|---|---|
| 4,615,617 | A * | 10/1986 | Frank .................... | G01S 7/4865 356/5.07 |
| 4,902,963 | A * | 2/1990 | Brust ...................... | G04F 10/00 968/844 |
| 5,204,640 | A | 4/1993 | Logan, Jr. | |
| 5,548,249 | A | 8/1996 | Sumita et al. | |
| 6,363,036 | B1 | 3/2002 | Siepmann | |
| 7,286,444 | B1 * | 10/2007 | Bahder .................... | G04G 7/02 250/336.1 |
| 7,508,852 | B2 | 3/2009 | Arahira | |
| 2007/0134002 | A1 | 6/2007 | Arahira | |
| 2019/0194972 | A1 * | 6/2019 | Brian ...................... | E04H 15/46 |
| 2024/0176305 | A1 | 5/2024 | Lehmann | |

FOREIGN PATENT DOCUMENTS

| | | | |
|---|---|---|---|
| CN | 118043744 | A | 5/2024 |
| DE | 19646283 | A1 | 5/1998 |
| DE | 102021129877 | B3 | 3/2023 |
| EP | 0326858 | A1 | 8/1989 |
| EP | 3440514 | B1 | 3/2020 |
| EP | 4459249 | A1 | 11/2024 |
| FR | 1386051 | A | 1/1965 |
| JP | 2018179662 | A | 11/2018 |
| SE | 8302216 | | 11/1983 |
| WO | 2000039642 | A1 | 7/2000 |
| WO | 2017173472 | A1 | 10/2017 |

OTHER PUBLICATIONS

PCT/EP2022/081832, Written Opinion dated Feb. 10, 2023, 5 pgs.

DE102021129880.6 Office Action, Aug. 3, 2022, 5 pgs.

Chinese Office Action, CN Patent Application No. 202280070083.4, May 29, 2026, 8 pgs.

* cited by examiner

TIME-MEASURING DEVICE

CROSS-REFERENCE TO RELATED APPLICATIONS

This application is a National Stage of International Application No. PCT/EP2022/081832, filed Nov. 14, 2022, which claims priority based on German Patent Application Nos. 102021129880.6, filed Nov. 16, 2021, the entire disclosures of which are incorporated herein by reference.

TECHNICAL FIELD

The invention relates to a time-measuring device.

BACKGROUND

Quartz timepieces and mechanical timepieces which are self-winding or hand-wound are known from the prior art. Quartz timepieces are clocked by the frequency of a crystal oscillator. Alternatively, self-winding mechanical timepieces, also known as automatic timepieces, and hand-wound mechanical timepieces, are generally controlled by oscillation of a balance wheel, which controls what is known as the escapement. Other time-measuring devices, e.g., in navigation devices, usually function analogously to quartz timepieces, in which the time measurement is clocked by the frequency of a crystal oscillator.

SUMMARY

The object of the invention is that of specifying a time-measuring device that is as precise as possible.

In the following, a time-measuring device is described which comprises at least the following: an electro-optical converter device comprising one or two parallel electro-optical converter(s), an opto-electric converter device, in particular comprising one or two parallel opto-electric converter(s), a first signal path, a second signal path, a control device, and a useful-signal generating device.

The first signal path comprises a waveguide (referred to as the first waveguide) and leads from the electro-optical converter device, via the waveguide, to the opto-electric converter device/into the opto-electric converter device. As a result, the first signal path can also comprise the opto-electric converter device, at least in part, in addition to the waveguide.

The second signal path leads from the electro-optical converter device to the opto-electric converter device/into the opto-electric converter device, either directly or via a second waveguide. Thus, the second signal path at least in part comprises the opto-electric converter device, and optionally the second waveguide.

The electro-optical converter device is configured for generating and feeding a first clocked light signal into the waveguide, and a second clocked light signal into the second signal path. The opto-electric converter device is configured for generating a first electrical signal based on the first clocked light signal, and a second electrical signal based on the second clocked light signal. Furthermore, the first signal path and the second signal path are configured such that a transit time of the first clocked light signal in the first signal path and the transit time of the second clocked light signal in the second signal path are different from one another. It is in particular provided that two light signals (first and second light signal) having the same frequency and without any phase shift, are generated in the electro-optical converter device, for the two signal paths, based on a control signal. The two light signals differ by a phase shift only by the different transit times in the two signal paths.

The control device is configured to generate the control signal based on a phase difference between the first electrical signal and the second electrical signal, and to actuate the electro-optical converter device, for generating the two light signals, by means of said control signal. It is noted that the control signal for controlling the electro-optical converter device corresponds to an output signal of the control device. Within the context of the present invention, the control device can in particular also be referred to as a control unit.

The useful-signal generating device is configured for generating a useful signal that clocks the time, based on a frequency of the control signal.

According to an advantageous embodiment of the invention, the time-measuring device can be a timepiece, in particular a watch, comprising a clock display device. In this case, the clock display device is configured for displaying the time based on the useful signal. According to a further advantageous embodiment of the invention, the time-measuring device can be a navigation device time-measuring device. The mode of operation of a navigation devices is based on a time measurement, specifically a measurement of the duration required by a radio signal from at least three satellites to the navigation device. The more precise the time measurement is, the more accurate the position determination of the navigation device can be. If the time-measuring device is not a timepiece, the time-measuring device can preferably comprise an application-oriented unit. The application-oriented unit can be implemented as software and/or hardware. If the time-measuring device is a navigation device time-measuring device, the application-oriented unit can be a position determination unit which is configured to determine a position of the navigation device based on the useful signal as a comparison signal.

The time-measuring device according to the present invention has the advantage that the waveguide of the first signal path is the frequency-determining, in particular the exclusively frequency-determining, element. In other words, the frequency which is used as the frequency for the clocking of the time-measuring device (clock frequency) is based on, in particular exclusively on, the duration of the travel of the light through the waveguide of the first signal path. This is achieved in particular by the provision of the above-described second signal path and control device. As a result, a signal delay, which is caused by electronic components of the time-measuring device, in particular the electro-optical converter device and the opto-electric converter device and is not very stable and calculable, has little or no influence on a clock frequency which results from the light transit time in the waveguide. In particular, it is possible to eliminate a response time of the electro-optical converter device and a response time of the opto-electric converter device from the determination of the clock frequency. That is to say, in other words, that a duration of the process of the conversion of an electrical signal into a light signal by the electro-optical converter device, and a duration of the process of the conversion of a light signal into an electrical signal by the opto-electric converter device, are not also taken into account when determining the frequency which is relevant for the clocking of the time-measuring device.

An advantage of a light-controlled time-measuring device configured as a timepiece is that the generation of the clock pulse is independent of influences such as a movement or a position (horizontal or vertical) of the timepiece. Thus, in particular a light-controlled watch according to the present invention is significantly more precise than a watch comprising a mechanical oscillation device which is braked or accelerated by every movement of the wrist of the wearer of the watch, in which the amount of tensioning of the mainspring of the timepiece mechanism influences the escapement, and thereby also the frequency of the balance/escapement tandem, and the position of which spring influences the oscillation behavior of the balance. If the time-measuring device is a navigation device time-measuring device, the present invention makes it possible to increase the accuracy of the navigation compared with a navigation device having time measurement based on crystal oscillators.

Furthermore, problems which arise in the case of a time-measuring device comprising a frequency-determining oscillating crystal, such as what is known as ageing of the oscillating crystal, i.e., an oscillation frequency deviation, which occurs over time due to penetration of impurities into the oscillating crystal or due to other time-based circumstances, do not arise in the case of the proposed light-controlled time-measuring device. Furthermore, generation of a clock pulse by means of a piezoelectric oscillating crystal, just like generation of a clock pulse by means of a balance, is also based on a mechanical oscillation, specifically the piezoelectrically excited mechanical oscillation of the oscillating crystal. A mechanical oscillation of this kind is more susceptible to damping than the clocked light signal in the proposed time-measuring device. Thus, the light-controlled time-measuring device of the present invention is more accurate than a time-measuring device in which the clock pulse is generated by the oscillation of a piezoelectric oscillating crystal.

Moreover, the light-controlled time-measuring device according to the present invention offers a high degree of flexibility with respect to the selection of the clock frequency of the time-measuring device which, as already described, is based on the light transit time in the waveguide of the first signal path. The clock frequency can be easily selected according to the respective requirements of the time-measuring device and/or the design requests of the owner/wearer of a time-measuring device configured as a timepiece/watch. Thus, for example, it is possible to design the waveguide of the first signal path in a simple manner, in such a way that the clock frequency has a particular value.

The electro-optical converter device, the first signal path, the second signal path and the control device advantageously form a loop, in particular a control loop.

Advantageously, the time-measuring device, in particular the useful-signal generating device, can comprise an interface for reading out the frequency of the useful signal.

It is to be understood that the first electrical signal and the second electrical signal are advantageously also clocked, since the first light signal and the second light signal are clocked.

The first clocked light signal and/or the second clocked light signal can in each case in particular be an analogue clocked light signal, in particular a sinusoidal light signal. Correspondingly, the first electrical signal and/or the second electrical signal can each in particular be an analogue electrical signal, in particular a sinusoidal electrical signal. Shapes other than the sinusoidal shape, such as a rectangular shape, are also possible, however, for the mentioned light signals or electrical signals. Alternatively to the analogue form, the first clocked light signal and/or the second clocked light signal can in each case in particular be digital (pulse-like). Correspondingly, the first electrical signal and/or the second electrical signal can each in particular be a digital (pulse-like) electrical signal.

The control device preferably comprises a phase comparator, a loop filter (LF) for integration of an output signal of the phase comparator, and an oscillator which can be actuated by an output signal of the loop filter. In this case, the control signal for controlling the electro-optical converter device corresponds to an output signal of the actuatable oscillator, or is at least based on the output signal of the actuatable oscillator.

Within the context of the present invention, the phase comparator can also be referred to as a phase frequency detector or phase detector. The phase comparator is configured to compare a phase of the first electrical signal and a phase of the second electrical signal with one another, and to output the phase difference resulting therebetween as the output signal.

In particular in the case of pulse-like electrical signals, the phase comparator is advantageously configured to generate an "up" signal and a "down" signal from the incoming first electrical pulse (first electrical signal) and the incoming second electrical pulse (second electrical signal), depending on which pulse is detected first.

The phase comparator preferably comprises a first input, a second input, a first, in particular clock edge-controlled, D flip-flop (DFF), a second, in particular clock edge-controlled, D flip-flop (DFF), and an AND gate. Each D flip-flop comprises a D-input (setting input), a Q-output, a reset input ("reset") and a clocking input. A high level is present at the D-input of each D flip-flop. The first input is connected to the clocking input of the first D flip-flop and a first input of the AND gate, wherein the second input is connected to the clocking input of the second D flip-flop and a second input of the AND gate. The reset input of the first D flip-flop and the reset input of the second D flip-flop are connected to an output of the AND gate. The Q-output of the first D flip-flop is connected to the Q-output of the second D flip-flop by means of a subtractor. The clocking input of the first D flip-flop and/or the clocking input of the second D flip-flop is/are advantageously not negated. In particular, a respective connection, preferably each connection, of the described connections is a direct connection. That is to say in particular that no further element is arranged between the elements that are interconnected in each case.

The loop filter is advantageously formed as an integrator, which is configured to integrate the output signal of the phase comparator and in particular to convert it into a DC voltage. The greater the phase shift of the electrical signals entering the phase comparator (first electrical signal and second electrical signal), the higher the DC voltage that is produced by the loop filter for the following actuatable oscillator. Alternatively, the loop filter can advantageously be an RC element or an arrangement composed of a charge pump and a capacitor. The topology of the loop filter is independent of the type of the actuatable oscillator used. RC elements are understood to mean circuitry constructed from one or more ohmic resistors and one or more capacitors.

The actuatable oscillator can preferably be a voltage-controlled oscillator.

Alternatively, the actuatable oscillator can preferably comprise an adjustable piezoelectric oscillating crystal having a trimmer capacitor. The trimmer capacitor is configured to trim the piezoelectric oscillating crystal to a frequency which results on the basis of the light transit time in the waveguide of the first signal path. This means that the loop filter actuates the trimmer capacitor such that said capacitor sets the oscillation frequency of the piezoelectric oscillating crystal in such a way that this corresponds to the frequency which is based on the transit time of the light in the first waveguide.

For this purpose, the length of the waveguide of the first signal path and the oscillation frequency of the piezoelectric oscillating crystal are matched to one another in advance. This matching advantageously takes place at a predetermined temperature (also referred to as target temperature). On the side of the waveguide of the first signal path, this can take place by measuring the length thereof in relation to the light speed, such that the time required for example by a light pulse to travel through the waveguide corresponds to the reverse value of the planned oscillation frequency. At the same time, the cut of the piezoelectric oscillating crystal is measured such that the oscillation frequency (main frequency) at which the piezoelectric oscillating crystal oscillates corresponds to the planned value or substantially the planned value. In other words, the piezoelectric oscillating crystal is cut such that it oscillates spontaneously at the same frequency which is specified by the waveguide of the first signal path. If for example the waveguide of the first signal path is configured such that this would lead to a frequency of the first light signal of 10 MHz, the piezoelectric oscillating crystal is cut such that the oscillation frequency (main frequency) of the piezoelectric oscillating crystal is also 10 MHz.

The piezoelectric oscillating crystal is preferably a tourmaline crystal. However, it is also possible for other piezoelectric oscillating crystals to be used in combination with a trimmer capacitor. For example, a quartz crystal can also be used here.

It is furthermore advantageous if the trimmer capacitor can change the oscillation frequency of the piezoelectric oscillating crystal within a range of the oscillation frequency, in such a way that the piezoelectric oscillating crystal still oscillates, in the case of a temperature change, at the frequency resulting from the transit time of the light in the waveguide. This means that, for example in the case of a temperature change of 5 degrees Celsius, in the case of a piezoelectric oscillating crystal configured as a tourmaline crystal, a frequency change of possibly 80 Hz would occur. However, owing to the control loop, the entire arrangement always oscillates identically, or also changes frequency due to the temperature change, but in a different way from that in which the frequency of the tourmaline crystal changes. Since, on account of the control loop, the trimmer capacitor always reduces the tourmaline crystal to the frequency which is specified by the waveguide of the first signal path, it is particularly advantageous if the tourmaline crystal can be controlled correspondingly and allows the change of 80 Hz.

The trimmer capacitor can preferably be a capacity diode.

Advantageously, the control device can be implemented as hardware and/or software. That is to say that the control device can be implemented either entirely as hardware or software, or in part as hardware and in part as software.

The opto-electric converter device preferably comprises a first opto-electric converter and second opto-electric converter. In this case, the first signal path advantageously comprises the first opto-electric converter, wherein the second signal path comprises the second opto-electric converter. The first opto-electric converter is configured for generating the first electrical signal based on the first clocked light signal, and the second opto-electric converter is configured for generating the second electrical signal based on the second clocked light signal. The embodiment of the time-measuring device comprising two opto-electric converters has the advantage that the first electrical signal and the second electrical signal can easily be generated separately from one another. Advantageously, the first opto-electric converter is configured identically to the second opto-electric converter. In other words, the first opto-electric converter and the second opto-electric converter are preferably configured identically. This ensures that a response time of the first opto-electric converter is identical to a response time of the second opto-electric converter. As a result, a signal delay caused by the first opto-electric converter and a signal delay caused by the second opto-electric converter are of the same magnitude. This in turn makes it possible to ensure that the light transit time in the waveguide of the first signal path is exclusively frequency-determining, since the mentioned signal delays are mutually eliminated by the control device.

Alternatively, the opto-electric converter device comprises a single opto-electric converter. The opto-electric converter device is advantageously configured to convert the first clocked light signal into the first electrical signal, and the second clocked light signal into the second electrical signal. For this purpose, the opto-electric converter device receives the two light signals from the two signal paths as a superimposition signal, and preferably comprises a signal splitter which is configured for generating the first electrical signal and the second electrical signal from the superimposition signal. In this variant, the first signal path can advantageously comprise the first waveguide, the optical splitter of the electro-optical converter device, the single opto-electric converter, and the first signal splitter signal path of the signal splitter. The second signal path can advantageously comprise the single opto-electric converter and a second signal splitter signal path of the signal splitter. In this case, the optical splitter preferably comprises a semi-transparent mirror. Furthermore, in this case the first waveguide of the first signal path can preferably be the single waveguide of the time-measuring device.

According to a first advantageous embodiment of the invention, the electro-optical converter device comprises only one electro-optical converter and one optical splitter. The single electro-optical converter is configured for generating a clocked light signal based on the control signal, wherein the optical splitter is configured for splitting the clocked light signal into the first clocked light signal and the second clocked light signal. Providing a single electro-optical converter in the electro-optical converter device makes it possible for the time-measuring device to be provided having a relatively low energy consumption for generating the first clocked light signal and the second clocked light signal. The optical splitter can preferably comprise a partially transparent mirror, in particular a partially transparent concave mirror.

According to a second advantageous embodiment of the invention, the above-mentioned electro-optical converter is a first electro-optical converter, wherein the electro-optical converter device further comprises a second electro-optical converter. In other words, the electro-optical converter device according to the second advantageous embodiment of the invention comprises two electro-optical converters. Both electro-optical converters are actuated by the one control signal, and thereby preferably generate light signals that are identical in frequency and in phase. In this case, the first electro-optical converter is configured for generating the first clocked light signal, wherein the second electro-optical converter is configured for generating the second clocked light signal. Designing the electro-optical converter device having two electro-optical converters makes it possible for the first light signal and the second light signal to be provided without significant technical outlay. Furthermore, a quality of the first light signal and of the second light signal is ensured, since the two light signals are generated separately from one another. Moreover, it is possible to set the intensity of the two light signals separately. In particular, providing two electro-optical converters is advantageous in time-measuring devices in which a sufficient power supply can be ensured.

According to an advantageous embodiment of the invention, the second opto-electric converter can be arranged directly next to the electro-optical converter device. In particular, the second opto-electric converter can be directly connected to the electro-optical converter device. In an alternative advantageous embodiment of the invention, a second waveguide of the second signal path can extend in parallel with the first waveguide of the first signal path. As a result, the electro-optical converter device, in particular the second electro-optical converter, is connected to the opto-electric converter device via the second waveguide. In this case, the second waveguide is preferably shorter, in particular much shorter, than the first waveguide. The first waveguide is preferably at least 3 times, preferably at least 10 times, more preferably at least 30 times, longer than the waveguide of the second waveguide. It is noted that the provision of the second waveguide is independent of whether the electro-optical converter device comprises a single electro-optical converter or two electro-optical converters.

In the time-measuring device according to the present invention, a waveguide can be provided in the first signal path and an electro-optical converter device having one or two electro-optical converter(s), or a waveguide can be provided in the first signal path, a waveguide in the second light wave path, and an electro-optical converter device comprising one or two electro-optical converter(s). The decision of whether just one waveguide (the waveguide of the first signal path) or two waveguides, and/or just one electro-optical converter or two electro-optical converters is/are better, depends on the aim of the function or certain predetermined parameters of the time-measuring device, such as maximum power consumption, etc.

For improved understanding, it is furthermore noted that, in the case of an electro-optical converter device comprising one single electro-optical converter, the first clocked light signal and the second clocked light signal originally represent one single optical signal, specifically the above-mentioned clocked light signal. Said signal is generated and emitted by the single electro-optical converter, and then split, by splitting by means of the optical splitter, onto the two signal paths, i.e., the first signal path and the second signal path. In this case, the first signal path is advantageously understood as that which is frequency-determined. In contrast to the second signal path, the first signal path can comprise a waveguide (first waveguide), while the second signal path can lead directly into the opto-electric converter device. Alternatively, the second signal path can also comprise a waveguide (second waveguide), which is advantageously shorter than the waveguide of the first signal path. In this case, the first light signal travels through the longer waveguide (first waveguide) of the first signal path, wherein the second light signal travels through the shorter waveguide of the second signal path (second waveguide). This means that the passage time of the first light signal is longer than the passage time of the second light signal. Since both light signals, after passing through their respective waveguide and after conversion into the corresponding electrical signal, strike the control device, in particular the phase comparator, the light signal referred to as the "first clocked light signal" therefore strikes later than the light signal referred to as the "second clocked light signal". Therefore, viewed in terms of time, the light signal referred to as the "first clocked light signal" is actually the second signal, and the light signal referred to as the "second clocked light signal" is actually the first signal, when striking the control device, in particular the phase comparator.

If the time-measuring device comprises a first waveguide and a second waveguide, the first waveguide and the second waveguide are preferably configured in such a way that a transit time of the first clocked light signal in the first waveguide and a transit time of the second clocked light signal in the second waveguide, at a predetermined temperature (target temperature), are different from one another. Furthermore, the first waveguide and the second waveguide are preferably configured such that a change in the transit time of the first clocked light signal in the first waveguide in the case of a predetermined temperature deviation from the predetermined temperature is the same as a change in the transit time of the second clocked light signal in the second waveguide in the case of the same predetermined temperature deviation (from the predetermined temperature). In other words, the first waveguide and the second waveguide are preferably configured such that these exhibit exactly the same change in a travel duration of the respective light signal through the corresponding waveguide, on account of any temperature changes. If for example the temperature rises by 5 degrees Celsius from a predetermined temperature, and if, on account of the mentioned temperature increase, the time duration required by the first clocked light signal to travel through the first waveguide increases by "n1" nanoseconds, the second waveguide also has a passage time of the second clocked light signal that is increased by "n1" nanoseconds, in the case of the same temperature increase. If the temperature reduces for example by 2 degrees Celsius and the first clocked light signal therefore travels through the first waveguide "n2" nanoseconds faster, the duration of a passage of the second clocked light signal through the second waveguide is also "n2" nanoseconds shorter.

This embodiment of the time-measuring device makes it possible not only for the signal delays caused by the electro-optical converter device and the opto-electric converter device, as described above, to be eliminated by the determination of the clock frequency of the time-measuring device, but rather a temperature deviation from the predetermined temperature, which influences the light transit time in the first waveguide, can also be compensated. Thus, the precision of the time-measuring device can also be ensured in the case of temperatures deviating from the predetermined temperature.

It is noted that the proposed temperature compensation can lead to more precise clocking of the time-measuring device than a temperature compensation in which a current temperature is measured by means of a temperature sensor and a pulse counter (binary counter) is adjusted based on a temperature deviation between a current temperature and a predetermined temperature. A reason for this is that it is not always possible to ensure that the temperature sensor very precisely acquires the temperature of a respective waveguide, in particular the first waveguide, and/or the temperature of the surroundings of the respective waveguide, in particular the first waveguide. Furthermore, it is possible for the temperature measurement itself to be influenced by a changed temperature, such that the adjustment of the pulse counter cannot take place correctly. Thus, a downstream, electronic compensation by means of the pulse counter, in which a frequency change is compensated, which is set on the basis of a temperature change, can harbor a potential of errors. For these reasons, a temperature compensation on the side of the waveguide is more precise.

Since the control device always precisely reproduces the frequency which results from the temporal difference, in other words the phase difference, between the first electrical signal and the second electrical signal, the frequency always remains the same, whatever the temperature change that is present and whatever time delay the respective waveguide produces as a result. This is because, in each case, the time delay of the first waveguide, resulting from the temperature change, is exactly the same as the time delay of the other waveguide. The difference between the two is the always the same. Thus, the frequency of the control signal output by the control device, in particular the actuatable oscillator, is always the same, irrespective of any temperature change.

It is noted that the temperature of the surroundings of a respective waveguide, and/or the temperature of a respective waveguide, can be understood as the temperature. The predetermined temperature in particular corresponds to the temperature at which the first waveguide is configured such that a reference frequency, to be achieved, for the clocking of the time-measuring device is made possible. The predetermined temperature can in particular be 25 degrees Celsius. It is noted that the temperature deviation is a temperature difference between a current temperature and the predetermined temperature. It is further noted that in this case it is not necessary to measure the current temperature.

The main factors that trigger a change in the time duration of the travel of light in a waveguide in the case of a temperature change, in this case the travel of light in the first waveguide and the second waveguide in the case of a temperature deviation from the predetermined temperature, are the longitudinal extension of the waveguide, visible from its respective expansion coefficient, and the change in the light speed owing to a change in the refractive index in the respective waveguide. Thus, a purposeful selection or setting of the expansion coefficient and/or the refractive index of the first waveguide and/or of the second waveguide makes it possible to achieve the same change in the light transit time in the first waveguide and in the second waveguide, in the case of a temperature deviation from the predetermined temperature.

In this respect, the first waveguide and the second waveguide particularly preferably differ in terms of the material through which light signal streams, and/or the length, and/or the cross-sectional design. In this case, the second waveguide is in particular shorter than the first waveguide. The selection of the material through which light passes, and/or the length, and/or the cross-sectional design of the first waveguide and/or of the second waveguide makes it possible for the expansion coefficient and/or the refractive index of said waveguides to be set.

An expansion coefficient of the first waveguide and/or of the second waveguide can preferably be between $0.41\times10^{-6}$ $K^{-1}$ and $8\times10^{-6}$ $K^{-1}$.

In particular, a ratio of the expansion coefficient of the first waveguide to the expansion coefficient of the second waveguide can be between 1:30 and 1:4, in particular 1:16.

According to an advantageous embodiment of the invention, the first waveguide is configured as a hollow-core fiber, wherein the second waveguide is configured as a solid-core fiber. In particular, the second waveguide can be a monomodal fiber or a multimode fiber. In this case, a ratio of the expansion coefficient of the first waveguide to the expansion coefficient of the second waveguide is advantageously 1:16.

As already described, the response of the time duration of the light travel through a waveguide to a temperature change is specified not only by the length change of the waveguide but rather at least also by the change in the refractive index of the light-conducting material. Thus, the change in the light speed for example through pure glass, on account of the changed refractive index, also causes a very significant time delay compared with the longitudinal extension of the waveguide. The change in the refractive index of air due to the temperature change is, in contrast, very small. This results in a very significant difference between the response of a hollow-core fiber to a temperature change and of a solid-core fiber, i.e., for example a monomodal fiber or a multimode fiber.

Since hollow-core fibers are usually produced from pure quartz glass, which is not doped with germanium, but solid-core fibers are normally doped with germanium, the difference of the expansion coefficients between the two fiber types is serious (the expansion coefficient for hollow-core fibers is approximately $0.41\times10^{-6}$, while that of solid-core fibers is approximately $8\times10^{-6}$). Since both the expansion coefficient and the refractive index result in an increase in the time duration of the travel of light through the waveguide when the temperature increases, and since both the expansion and the refractive index change come into effect many times more significantly in the case of the solid-core fiber than in the case of the hollow-core fiber, a very serious difference results in the time duration change in the case of the two fiber types due to the temperature change.

This benefits opposing the first waveguide and the second waveguide by means of the control device, in particular the phase comparator. Ultimately, only the difference of the two waveguides remains as the frequency-determining light guide path. However, since the length of the waveguide is very decisive for the precision of the time-measuring device, if possible, the second waveguide should be as short as possible, and the first waveguide should be as long as possible. In order to achieve this, the ratio between the response to the temperature change should be as large as possible. This is because the ratio of the length of the two waveguides should be proportional to the ratio of the response to the temperature change.

It is furthermore noted that, for simple handling of this method of temperature compensation, the response to the temperature change (by longitudinal extension and change of the refractive index) should extend linearly in the case of both fiber types.

A temperature compensation on the side of the waveguide is also possible, in the case of a detected drop in the current temperature, by heating the first waveguide and/or the second waveguide, such that a temperature change of the first waveguide and/or of the second waveguide, and thus also a change in the light transit time in the respective waveguide, is prevented. However, heating of the first waveguide and/or of the second waveguide can be very complicated and can consume a lot of power, and furthermore harbor the risk that the heating device used for this purpose is not absolutely perfect, and thus itself causes a certain inaccuracy of the time-measuring device.

Preferably, a reflector is arranged at a reflector end of the waveguide of the first signal path (first waveguide), by means of which reflector the first clocked light signal can be reflected back into the waveguide of the first signal path. In this case, the first signal path is configured such that the reflected first clocked light signal can be outcoupled into the first opto-electric converter at an infeed end of the waveguide of the first signal path. Thus, at a constant length of the waveguide of the first signal path, a path that the light has to travel until it is acquired by the opto-electric converter device is doubled. Thus, a desired reference frequency for the clocking of the time-measuring device can be achieved, with a more compact design of the time-measuring device. Furthermore, as a result the costs for the waveguide of the first signal path, and thus also of the time-measuring device, can be reduced. This is particularly advantageous if the waveguide of the first signal path is configured as a hollow-core fiber, with respect to the aspect of the precision of the time-measuring device, since a hollow-core fiber is very laborious to produce or provide. For example, a hollow-core fiber of a length of 20 m would make up over 95% of the total costs of the time-measuring device. Thus, providing a reflector at a reflector end of the waveguide of the first signal path makes it possible for the cost-price of the time-measuring device to be reduced by almost 50%.

The reflector is preferably configured as a concave mirror. In this case, the concave mirror is advantageously configured to re-collimate divergent light emerging from the waveguide. In particular, the concave mirror can be a spherical concave mirror. However, it is also possible for the reflector to be a different type of mirror, which is suitable in particular for reflecting back the light signal emerging at the reflector end. According to an alternative advantageous embodiment of the invention, the reflector can be configured as a plane mirror which is arranged directly on the reflector end, i.e. directly at the corresponding output, of the corresponding waveguide. For this purpose, an end cap can advantageously be arranged directly on the reflector end of the waveguide, the inner surface of which end cap, i.e., the surface of the end cap facing the reflector end of the waveguide, is mirrored. This can make it possible that little or no light is lost after the reflection. The embodiment of the invention comprising the mirrored end cap has the further advantage that, if for example a separate end cap is arranged on the reflector end, in addition to a concave mirror, a separate component, and the associated adjustment, can be saved.

The first signal path preferably comprises an optical splitter at the infeed end of the waveguide, which splitter is configured for outcoupling the reflected first clocked light signal into the first opto-electric converter. The optical splitter preferably comprises a semi-transparent mirror or a fiber splitter.

Preferably, the electro-optical converter device can further comprise a lens between the optical splitter and the electro-optical converter. The lens is in particular configured to refract light emitted by the electro-optical converter in such a way that the light propagates in a parallel direction. A converging lens can advantageously be used for this purpose. In this case, a focal point of the converging lens is advantageously located on the point from which the light generated by the electro-optical converter is emitted. However, the lens can also be configured to collect divergent light, which is emitted by the electro-optical converter, and to focus said light on a point, in particular on the center of the first waveguide.

Within the context of the present invention, the lens can advantageously comprise a single lens element or an optical system comprising at least two lens elements.

Preferably, a respective electro-optical converter of the electro-optical converter device comprises a semiconductor laser or a light-emitting diode. That is to say that, in the cases of the above-described embodiments of the time-measuring device, the single electro-optical converter of the electro-optical converter device or the first electro-optical converter and/or the second electro-optical converter in each case comprises/comprise a semiconductor laser or a light-emitting diode. The semiconductor laser can in particular be a pigtail semiconductor laser. Correspondingly, the light-emitting diode can be a pigtail light-emitting diode.

Preferably, a respective opto-electric converter comprises a photodiode. The photodiode is configured to convert the corresponding clocked light signal into the corresponding electrical signal.

Within the context of the present invention, the useful-signal generating device can also be referred to as an electronic useful-signal generating device.

In order to generate the above-mentioned useful signal, the useful-signal generating device can preferably comprise a pulse counter (binary counter). In this case, the pulse generator is advantageously configured to count the control signal. In this case, the useful-signal generating device is advantageously configured to generate the useful signal when a count value of the control signal is equal to a predetermined count value. The predetermined count value is advantageously set to a frequency which is based on a light transit time in the waveguide of the first signal path.

Alternatively, in order to generate the above-mentioned useful signal, the useful-signal generating device can advantageously comprise a frequency divider. The frequency divider is configured to divide the frequency of the control signal. In this case the useful signal advantageously corresponds to the output signal of the frequency divider. In this case, the frequency of the control signal can in particular correspond to a multiple of two, in particular a power of two, such as 524288 Hz or 1048576 Hz. In this case, the frequency of the control signal can advantageously be broken down, by means of the frequency divider, to 1 Hz or another frequency such as 8 Hz. The broken-down frequency corresponds, for example in the case of a time-measuring device configured as a timepiece, to the useful signal, based on which the clock display device is configured to display the time. It is noted that, in the case of a useful signal having a frequency of e.g., 8 Hz, the jump of a second hand of a mechanical clock display device, which then takes place 8 times per second, is no longer perceived by the observer as a “jump”.

In order to generate the useful signal, a combination of a frequency divider with a pulse counter is also possible. In this case, the frequency divider is advantageously arranged in front of the pulse counter, in terms of signaling. In an advantageous manner, the frequency of the control signal can be halved, in particular halved multiple times, by the frequency divider, in a first step, in order to achieve an intermediate frequency. In a second step, the intermediate frequency can be brought to a desired frequency or a useful frequency by means of the pulse counter. In this case, the useful-signal generating device is advantageously configured to generate the useful signal when a count value of the output signal of the frequency divider is equal to a predetermined count value. In this case, the predetermined count value is advantageously set in a manner based on the intermediate frequency achieved by the frequency divider. The approach of halving, in particular halving multiple times, the frequency of the oscillating crystal in a first step, in order to achieve an intermediate frequency, and counting down the intermediate frequency to a desired frequency in a second step, is particularly advantageous in the case of a time-measuring device in which the control signal has a high frequency, e.g., 8.88 MHz or 10 MHz. Thus, power can be saved compared with simply counting down the frequency of the control signal.

In the case of the control signal being analogue, the useful-signal generating device advantageously comprises a device for converting the analogue control signal into a digital signal.

According to an advantageous embodiment of a time-measuring device configured as a timepiece, the clock display device is a mechanical clock display device. In this case, the timepiece preferably comprises a drive device, by means of which the mechanical clock display device can be moved. In this case, the drive device is advantageously actuatable by means of the useful signal. In particular, the clock display device can comprise an hour hand and/or a minute hand and/or a second hand.

Advantageously, the timepiece can further comprise a clockwork. In this case, the drive device is configured for driving the clockwork. The clock display device is connected to the clockwork and movable by means of the clockwork. The clockwork preferably comprises at least an hour wheel and/or a minute wheel and/or a second wheel, and/or a third wheel.

The drive device is preferably configured as a stepper motor.

According to an advantageous embodiment of a time-measuring device configured as a timepiece, the clock display device is an electronic clock display device which is configured for displaying the time based on the useful signal.

Furthermore, the time-measuring device preferably comprises a power supply device, which is configured to supply power to the electro-optical converter device and/or the control device and/or the useful-signal generating device and/or the drive device and/or—in the case of a time-measuring device configured as a timepiece—the clock display device, if this is configured as an electronic clock display device.

The power supply device can preferably comprise at least one battery. The at least one battery can preferably be charged by an energy-harvesting device. The energy-harvesting device can preferably comprise at least one thermogenerator and/or at least one solar cell. The thermogenerator can in particular comprise one or more thermoelements.

It is noted that, in the context of the present invention, the waveguide of the first signal path can also be referred to as the first waveguide, even in the case of time-measuring devices which comprise just one single waveguide, specifically the waveguide of the first signal path.

BRIEF DESCRIPTION OF THE DRAWINGS

Further details, advantages and features of the present invention emerge from the following description of embodiments with reference to the drawings, wherein identical or functionally identical components are denoted by the same reference characters in each case. In the drawings.

DETAILED DESCRIPTION

In the following, a time-measuring device 100 according to a first embodiment of the present invention will be described in detail with reference to FIG. 1 to 4.

Figure 1:
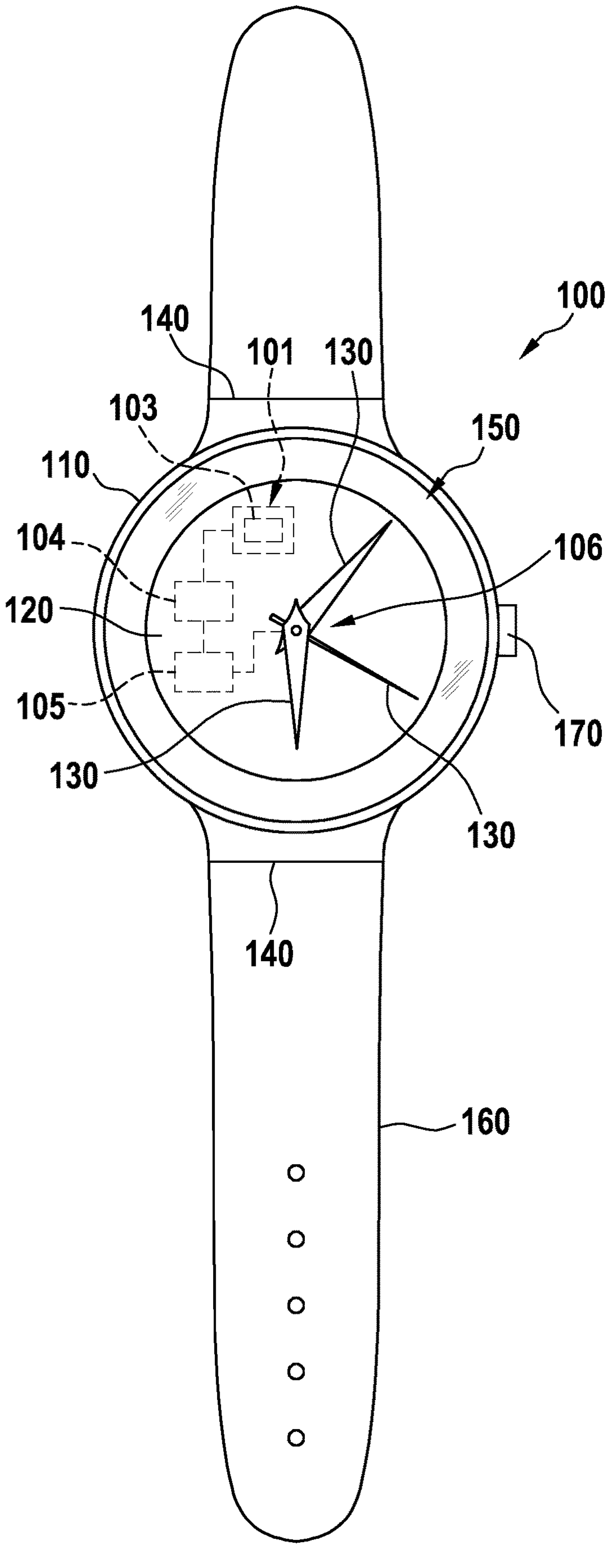
FIG. 1 is a simplified schematic view of a time-measuring device according to a first embodiment of the present invention.

As is clear from FIG. 1, the time-measuring device 100 is configured as a timepiece, in particular, a watch, and thus comprises two connections 140 for a wristband 160. However, it is also possible for the time-measuring device 100 to be a wall clock, a floor clock, a table clock, or a clock of another type.

The time-measuring device 100 further comprises a clock housing 110 and timepiece glass 150 arranged therein, a dial plate 120, a handwheel 170, and three hands 130 for displaying the hours, minutes and seconds. The hands 130 are parts of a mechanical clock display device 106 for displaying the time.

Furthermore, the time-measuring device 100 comprises a timing generator assembly 101, a clockwork 105, and a drive device 104 for driving the clockwork 105. The drive device 104 is in particular configured as a stepper motor. The clockwork 105 is connected to the mechanical clock display device 106 such that the hands 130 of the clock display device 106 are moved. In particular, the clockwork 105 comprises at least an hour wheel, a minute wheel and a second wheel, which are each connected to one of the hands 130.

The timing generator assembly 101 is configured to determine a frequency that is relevant for the clocking of the time-measuring device 100. Part of the timing generator assembly 101 is a useful-signal generating device 103 which is configured for generating a useful signal that clocks the time, based on a frequency of the control signal. For this purpose, the useful-signal generating device 103 can comprise a pulse counter. If the control signal is an analogue signal, in the case of the useful-signal generating device 103 a device for converting the analogue control signal into a digital (pulse-like) signal can be provided.

The drive device 104 is actuated based on the useful signal, in order to move the clockwork 105.

Figure 2:
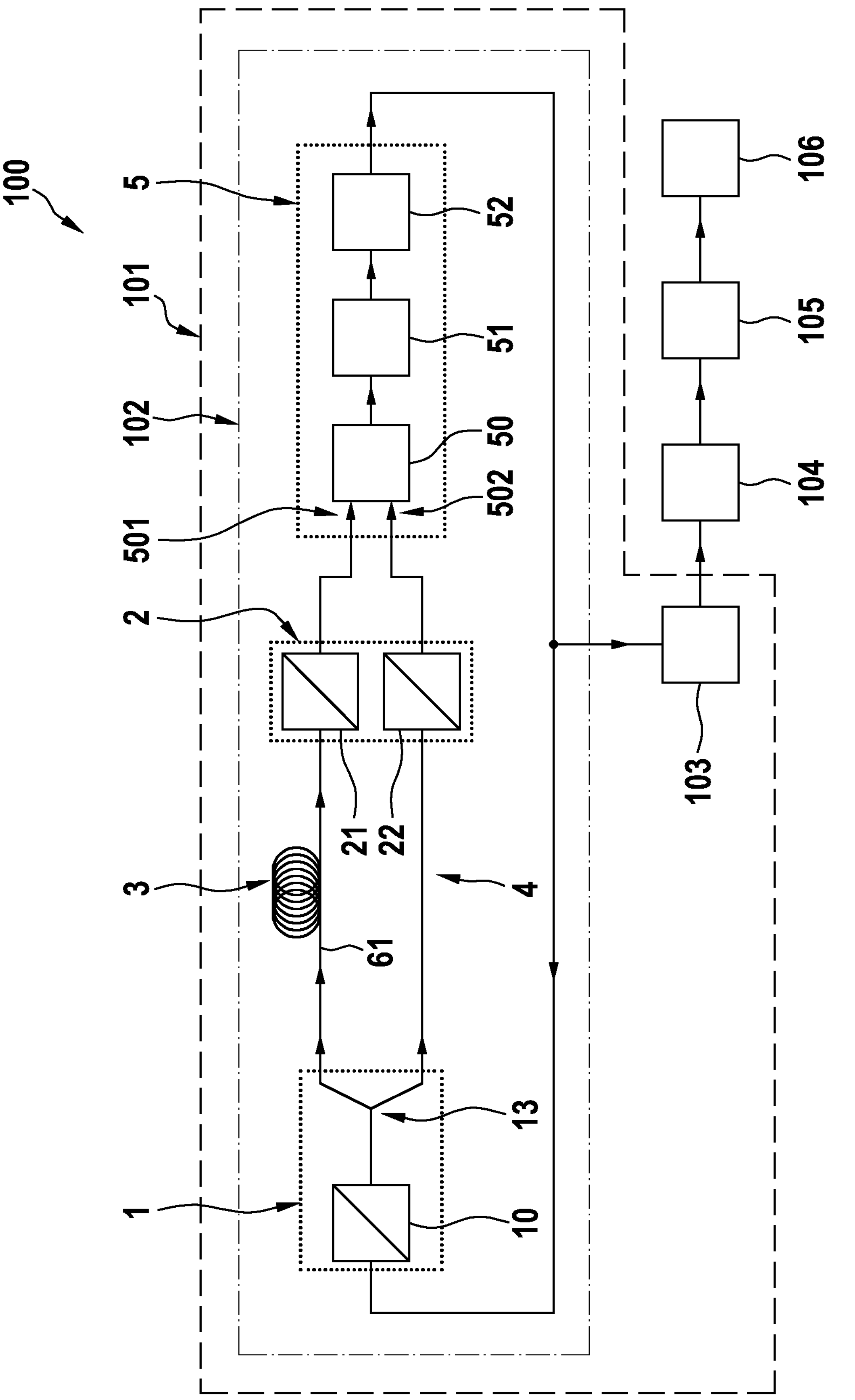
FIG. 2 is a simplified schematic view of a region of the time-measuring device according to the first embodiment.

It is visible from FIG. 2 that the time-measuring device 100 further comprises an electro-optical converter device 1, an opto-electric converter device 2, a first signal path 3, a second signal path 4, and a control device (control unit) 5. These components are parts of the timing generator assembly 101 and form an oscillation system 102. In this embodiment, the opto-electric converter device 2 comprises a first opto-electric converter 21 and second opto-electric converter 22. The first opto-electric converter 21 and/or the second opto-electric converter 22 can each comprise a photodiode.

The first signal path 3 comprises a waveguide (first waveguide) 61 and leads from the electro-optical converter device 1, via the waveguide 61, to the opto-electric converter device 2. As a result, the first signal path 3 comprises the first opto-electric converter 21, in addition to the waveguide 61. The second signal path 4 leads from the electro-optical converter device 1 to the opto-electric converter device 2, and thus comprises the second opto-electric converter 22. Therefore, the first signal path 3 and the second signal path 4 each comprise the opto-electric converter device 2, in part.

The electro-optical converter device 1 is configured for feeding a first clocked light signal into the first signal path 3, in particular into the waveguide 61, and a second clocked light signal into the second signal path 4. For this purpose, the electro-optical converter device 1 comprises a single electro-optical converter 10 and an optical splitter 13. The electro-optical converter 10, which can in particular comprise a semiconductor laser or a light-emitting diode, is configured to generate a clocked light signal. In this case, the optical splitter 13 is configured for splitting the clocked light signal, which can be generated by the electro-optical converter 10, into the first clocked light signal and the second clocked light signal.

The opto-electric converter device 2 can generate a first electrical signal based on the first clocked light signal, and a second electrical signal based on the second clocked light signal. In particular, the first opto-electric converter 21 is configured for generating the first electrical signal, and the second opto-electric converter 22 is configured for generating the second electrical signal.

The first opto-electric converter 21 and the second opto-electric converter 22 are advantageously configured identically. In other words, the two opto-electric converters 21, 22 are structurally identical, such that a signal delay caused by the first opto-electric converter 21 is the same as a signal delay caused by the second opto-electric converter 22. In this case, the second opto-electric converter 22 is arranged directly after the electro-optical converter device 1, in particular directly after the optical splitter 13. In particular, the second opto-electric converter 22 is directly connected to the optical splitter 13. It is noted at this point that, in this embodiment, for reasons of illustration, the direct connection between the second opto-electric converter 22 and the optical splitter 13 is shown by a line.

Therefore, the first signal path 3 and the second signal path 4 are configured such that a transit time of the first clocked light signal in the first signal path 3 and the transit time of the second clocked light signal in the second signal path 4 are different from one another. In particular, on account of the structurally identical opto-electric converters 21, 22, the transit time of the first clocked light signal in the first signal path 3 differs from the transit time of the second clocked light signal in the second signal path 4 only by the transit time of the first clocked light signal in the waveguide 61.

However, it is also possible, according to a modification of the first embodiment, for the first opto-electric converter 21 and the second opto-electric converter 22 to be configured differently, and/or for the electro-optical converter 10 to be connected to the second opto-electric converter 22 via a waveguide. In the latter case, the waveguide is part of the second signal path 4. In this case, the waveguide of the second signal path 4 is shorter, in particular much shorter, than the waveguide 61 of the first signal path 3. In this case, the waveguide 61 of the first signal path 3 is preferably at least 10 times, preferably at least 30 times, longer than the waveguide of the second signal path 4. In this embodiment, the waveguide 61 of the first signal path 3 can be referred to as a first waveguide, and the waveguide of the second signal path 4 can be referred to as a second waveguide.

The control device 5 is configured, based on a phase difference between the first electrical signal and the second electrical signal, to generate the above-mentioned control signal, on the basis of the frequency of which control signal the useful signal can be generated by the useful-signal generating device 103, and to control the electro-optical converter device 1, for generating the two light signals, by means of said useful signal.

It is in particular provided that two light signals (first and second light signal) having the same frequency and without any phase shift, are generated in the electro-optical converter device 1, for the two signal paths 3, 4, based on the control signal. The two light signals differ by a phase shift only by the different transit times in the two signal paths 3, 4.

For this purpose, the control device 5 comprises a phase comparator 50, a loop filter 51 for integration of an output signal of the phase comparator 50, and an oscillator 52 which can be actuated by an output signal of the loop filter 51.

The phase comparator 50 has a first input 501 and a second input 502. The first input 501 is configured to receive the first electrical signal, wherein the second input 502 is configured to receive the second electrical signal. For this purpose, the first input 501 is connected to the first opto-electric converter 21, and the second input 502 is connected to the second opto-electric converter 22. The phase comparator 50 is configured to compare a phase of the first electrical signal and a phase of the second electrical signal with one another, and to output the phase difference resulting therebetween as the output signal. The exact design and the mode of operation of the phase comparator 50 will be explained in more detail later, with reference to FIGS. 3 and 4.

The loop filter 51 is advantageously formed as an integrator, which is configured to integrate the output signal of the phase comparator 50 and to convert this into a DC voltage. Alternatively, an RC element or an arrangement consisting of a charge pump and a capacitor can be used as the loop filter 51. The greater the difference between the time duration of the incoming first electrical signal and the time duration of the incoming second electrical signal, the higher the DC voltage that is produced by the loop filter 51 for the following actuatable oscillator 52.

The actuatable oscillator 52 is configured as a voltage-controlled oscillator (VCO). Alternatively, it is possible for the actuatable oscillator 52 to comprise an adjustable piezo-electric oscillating crystal having a trimmer capacitor. In this case, the trimmer capacitor can in particular be configured as a capacity diode. Preferably a tourmaline crystal can be used as the piezoelectric oscillating crystal.

The output signal of the actuatable oscillator 52 corresponds to or is at least based on the control signal, by means of which the electro-optical converter device 1, in particular the electro-optical converter 10, is controllable.

Depending on the use or embodiment of the time-measuring device 100, the control device 5 can be implemented as hardware and/or software. That is to say that the components of the control device 5 are implemented exclusively as software or hardware, or that the control device 5 is configured as a combination of hardware and software.

For supply of power to the electro-optical converter device 1, the control device 5, the useful-signal generating device 103 and the drive device 104, the time-measuring device 100 comprises a power supply device.

The power supply device can comprise at least one battery. The at least one battery can preferably be charged by an energy-harvesting device, which preferably comprises at least one thermogenerator and/or at least solar cell.

By means of the electro-optical converter device 1, the first signal path 3, the second signal path 4, the opto-electric converter device 2 and the control device 5, which is in signal connection with the electro-optical converter device 1, a control loop, in particular a phase-locked loop, is formed. That is to say that the above-mentioned oscillation system 102 is configured as a control loop, in particular as a phase-locked loop.

The control loop can engage the frequency of the control signal at which the electro-optical converter 10 is clocked, and thus freeze the frequency of the oscillation system 102 to a constant value. In particular, the control loop makes it possible to engage the output signal of the actuatable oscillator 52 to an input signal of the phase comparator 50, and thus guarantees a constant, always identical frequency of the oscillation system 102, which serves as a starting point for the clocking of the time-measuring device 100.

Figure 3:
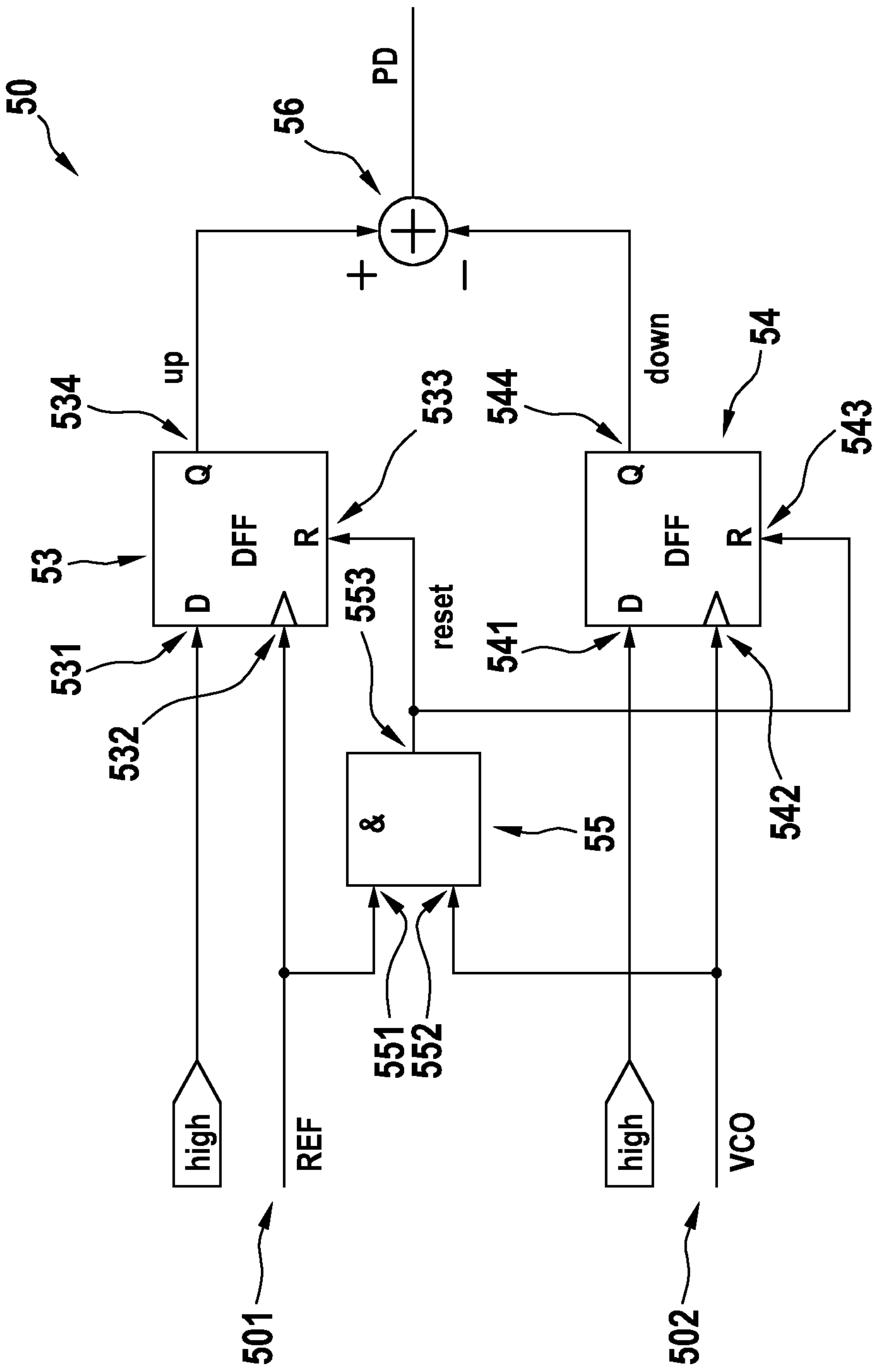
FIG. 3 is a circuit diagram of a phase comparator of the time-measuring device according to the first embodiment.
Figure 4:
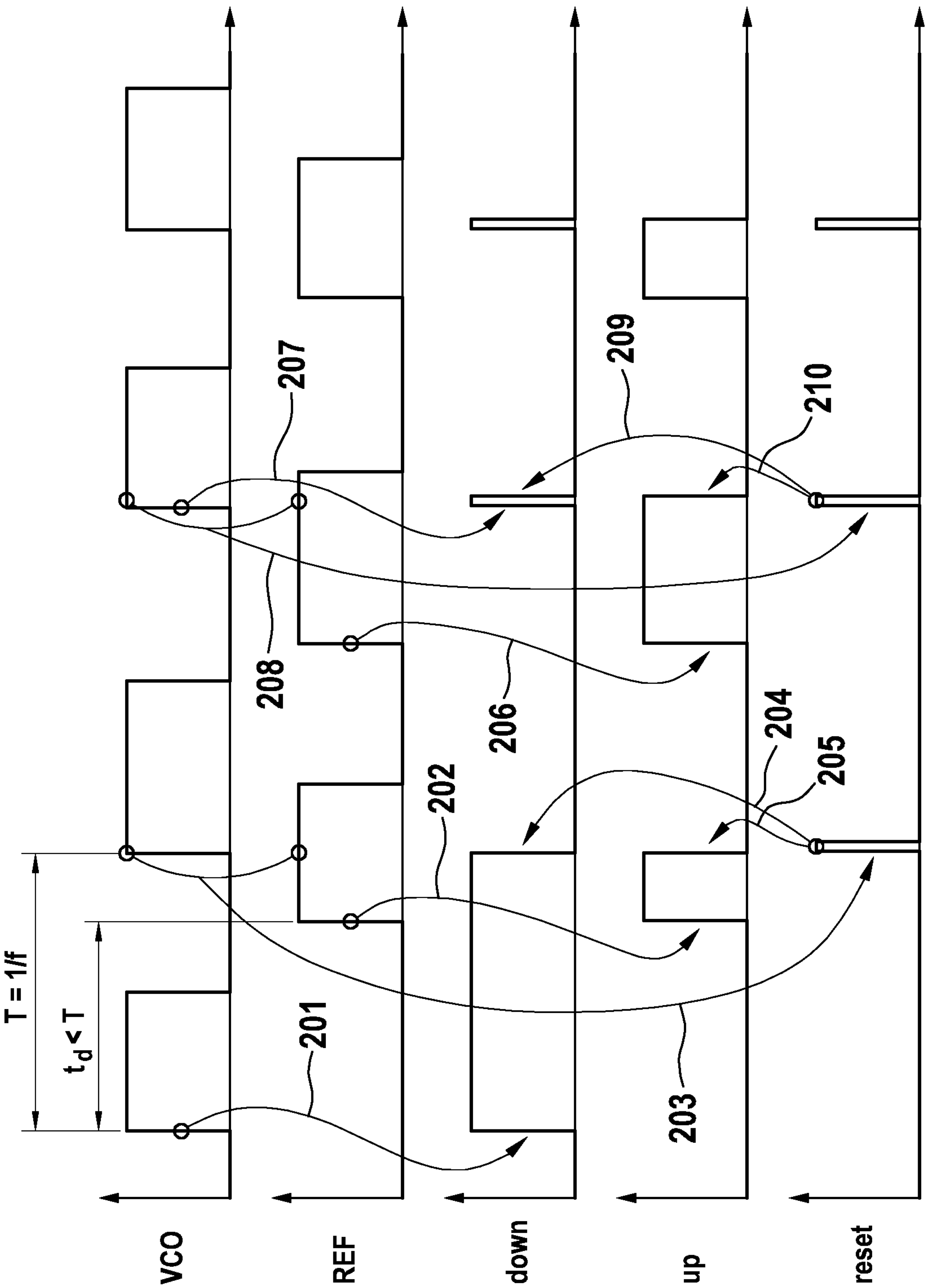
FIG. 4 is a flow diagram of the phase comparator from FIG. 3.

FIG. 3 is a circuit diagram of the phase comparator 50, from which its exact design follows. FIG. 4 is a flow diagram of the phase comparator 50.

It is clear from FIG. 3 that the phase comparator 50 comprises the first input 501, the second input 502, a first, in particular clock edge-controlled, D flip-flop (DFF) 53, and a second, in particular clock edge-controlled, D flip-flop (DFF) 54, and an AND gate 55.

The first D flip-flop 53 comprises a D-input (setting input) 531, a Q-output 534, a reset input 533 ("reset"), and a non-negated clocking input 532. Correspondingly, the second D flip-flop 54 comprises a D-input (setting input) 541, a Q-output 544, a reset input 543 ("reset"), and a non-negated clocking input 542. The clocking inputs 532, 542 each react only to a positive (rising) signal edge.

A high level is present at the D-input 531 of the first D flip-flop 53. The first input 501 of the phase comparator 50 is connected to the clocking input 532 of the first D flip-flop 53 and a first input 551 of the AND gate 55, wherein the second input 502 of the phase comparator 50 is connected to the clocking input 542 of the second D flip-flop 54 and a second input 552 of the AND gate 55. The reset input 533 of the first D flip-flop 53 and the reset input 543 of the second D flip-flop 54 are connected to an output 553 of the AND gate 55. The Q-output 534 of the first D flip-flop 53 is connected to the Q-output 544 of the second D flip-flop 54 by means of a subtractor 56. In particular, the described connections are direct connections, i.e., without connection of a further component between the respectively interconnected components.

The designation "REF" in the circuit diagram of FIG. 3 stands for "reference signal", which corresponds to the first electrical signal. The designation "VCO" stands for "voltage-controlled oscillator" and indicates a VCO signal which corresponds to the second electrical signal. The designation "PD" stands for "phase difference" and corresponds to the output signal of the phase comparator 50. "Reset" indicates a reset signal, wherein "up" stands for an up signal, and "down" stands for a down signal. The up signal corresponds to an output signal of the first D flip-flop 53, and the down signal corresponds to an output signal of the second D flip-flop 54.

The mode of operation of the phase comparator 50 will be explained in the following, with reference to the flow diagram of FIG. 4.

In the case of the first rising edge of the VCO signal (second electrical signal), the second (lower) D flip-flop 54 assumes the high level at the D-input 541 and sets the Q-output 544 of the second D flip-flop 54 to the high level. As a result, the down signal is "high" (arrow 201).

Following the delay time of the light through the waveguide 61 of the first signal path 3, the rising edge appears at the first input 501 of the phase comparator 50, which is also referred to as REF input, and the first (upper) D flip-flop 53 also assumes the high level from the D-input 531 and sets the up signal at the Q-output 534 to "high" (arrow 202).

In contrast to a conventional phase comparator 50, in which a reset of the flip-flop takes place when both output signals of the flip-flop are at "high level", the reset of the first D flip-flop 53 and of the second D flip-flop 54 takes place, in the case of the phase comparator 50 according to FIG. 3, when both input signals of the phase comparator 50, i.e., the VCO signal and the REF signal, are "high". However, the VCO signal is at "low level" again before the rising edge of the REF signal arrives at the phase comparator 50.

For this reason, the reset of the two D flip-flops 53, 54 takes place only after the next edge of the VCO signal, when this is again at "high level". At this point in time, the REF signal is also still "high", and a reset signal is generated (arrow 203).

The down signal (arrow 204) and the up signal (arrow 205) are reset by the reset signal. The first down pulse is longer than the up pulse, as a result of which an incorrect signal on one occasion reaches the loop filter 51 that follows the phase comparator 50. However, owing to the large time constant of the control, a single incorrect pulse is of no consequence.

Due to the amended resetting, a rising edge follows next at the first input 501 (REF input) of the phase comparator 50, as a result of which the up signal is "high" (arrow 206).

A following rising edge of the VCO signal also sets the down signal briefly to "high level" (arrow 207). Since now both the REF signal and the VCO signal, i.e., both inputs of the AND gate 55, are "high" (arrow 208), a reset signal appears at the output 553 of the AND gate 55, and both the down signal (arrow 209) and the up signal (arrow 210) are reset.

The up signal is at "high level" for longer than the down signal, as a result of which the frequency of the actuatable oscillator 52 is increased. This is repeated in the following cycles in the same way, until the actuatable oscillator 52 engages at the desired frequency.

The described circuitry guarantees temporal sorting, without problem, of the incoming electrical signals which can be generated by the two opto-electric converters 21, 22, specifically the first electrical signal and the second electrical signal. Thus, the phase comparator 50 allows for engagement of the control loop at the self-generated frequency. In particular, the described circuitry of the phase comparator 50 is advantageous in the case where, at the beginning (after switching on), a period T=1/f of the VCO signal is greater than the transit time of the first electrical signal in the waveguide 61 of the first signal path 3. If, at the beginning (after switching on), a period T=1/f of the VCO signal is not greater than the transit time of the first electrical signal in the waveguide 61 of the first signal path 3, a conventional phase comparator can also be used for the phase comparator 50.

The proposed time-measuring device 100, configured as a timepiece, in particular has the advantage that the oscillation system 102 is freed of the delays by the electronics components, and the frequency of the oscillation system 102, which is relevant for the clocking of the time-measuring device 100, depends in principle, in particular exclusively, on the duration of the travel of the first clocked light signal through the waveguide 61 of the first signal path 3, or on the light speed in the waveguide 61 of the first signal path 3 and on the length of the waveguide 61.

Figure 5:
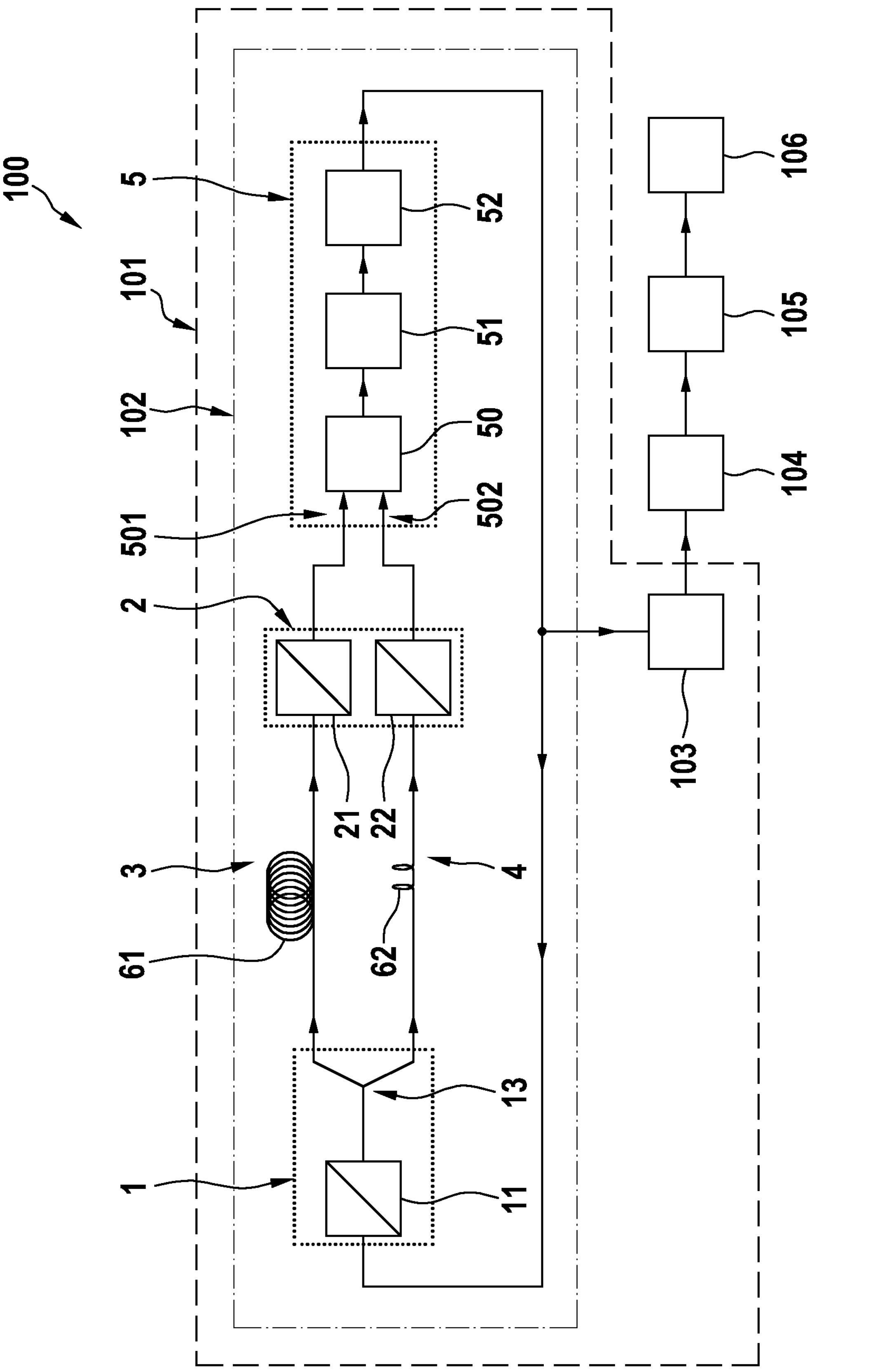
FIG. 5 is a simplified schematic view of a region of a time-measuring device according to a second embodiment of the present invention.

FIG. 5 relates to a time-measuring device 100 configured as a timepiece, according to a second embodiment of the invention.

The time-measuring device 100 according to the second embodiment differs from the time-measuring device 100 according to the first embodiment by the following design of the oscillation system 102:

In this case, the first signal path 3 comprises a first waveguide 61, and the second signal path 4 comprises a second waveguide 62. That is to say that the electro-optical converter device 1 is connected to the first opto-electric converter 21 via the first waveguide 61, and to the second opto-electric converter 22 via the second waveguide 62. In particular, in contrast to the time-measuring device 100 according to the first embodiment, in which there is a direct connection between the optical splitter 13 of the electro-optical converter device 1 and the second opto-electric converter 22, the second opto-electric converter 22 is connected to the optical splitter 13 of the electro-optical converter device 1 via the second waveguide 62. The first waveguide 61 and the second waveguide 62 can in particular extend in parallel with one another.

The first waveguide 61 and the second waveguide 62 are configured in such a way that a transit time of the first clocked light signal in the first waveguide 61 and a transit time of the second clocked light signal in the second waveguide 62, at a predetermined temperature, are different from one another.

Furthermore, the first waveguide 61 and the second waveguide 62 are configured such that a change in the transit time of the first clocked light signal in the first waveguide 61 in the case of a predetermined temperature deviation from the predetermined temperature is the same as a change in the transit time of the second clocked light signal in the second waveguide 62 in the case of the same predetermined temperature deviation. This means that, for example in the case of an increase of the transit time of the first clocked light signal by "n" nanoseconds on account of a temperature change, the second waveguide 62 is configured such that the transit time of the second clocked light signal in the second waveguide 62 is also increased by "n" nanoseconds, in the case of the same temperature change.

In order to achieve this, the first waveguide 61 and the second waveguide 62 can differ in terms of the material through which light can stream, and/or the length, and/or the cross-sectional design. In this case, the second waveguide 62 is shorter than the first waveguide 61. In this case, the first waveguide 61 is preferably at least 10 times, preferably at least 30 times, longer than the waveguide of the second waveguide 62.

In particular, the first waveguide 61 can be configured as a hollow-core fiber, wherein the second waveguide 62 can be configured as a solid-core fiber. In this case, in particular the second waveguide 62 can be a monomodal fiber or a multimode fiber. In this case, a ratio of the expansion coefficient of the first waveguide 61 to the expansion coefficient of the second waveguide 62 can be between 1:30 and 1:4, in particular 1:16.

The time-measuring device 100 configured as a timepiece according to the second embodiment in particular has the advantage that a temperature change of the first waveguide 61, which brings about a change in the original length and the refractive index of the first waveguide 61, can be compensated. In particular, for this purpose a temperature sensor and readjustment of the frequency specification for the pulse counter of the useful-signal generating device 103 can be omitted, as a result of which possible measurement inaccuracies can be eliminated.

Figure 6:
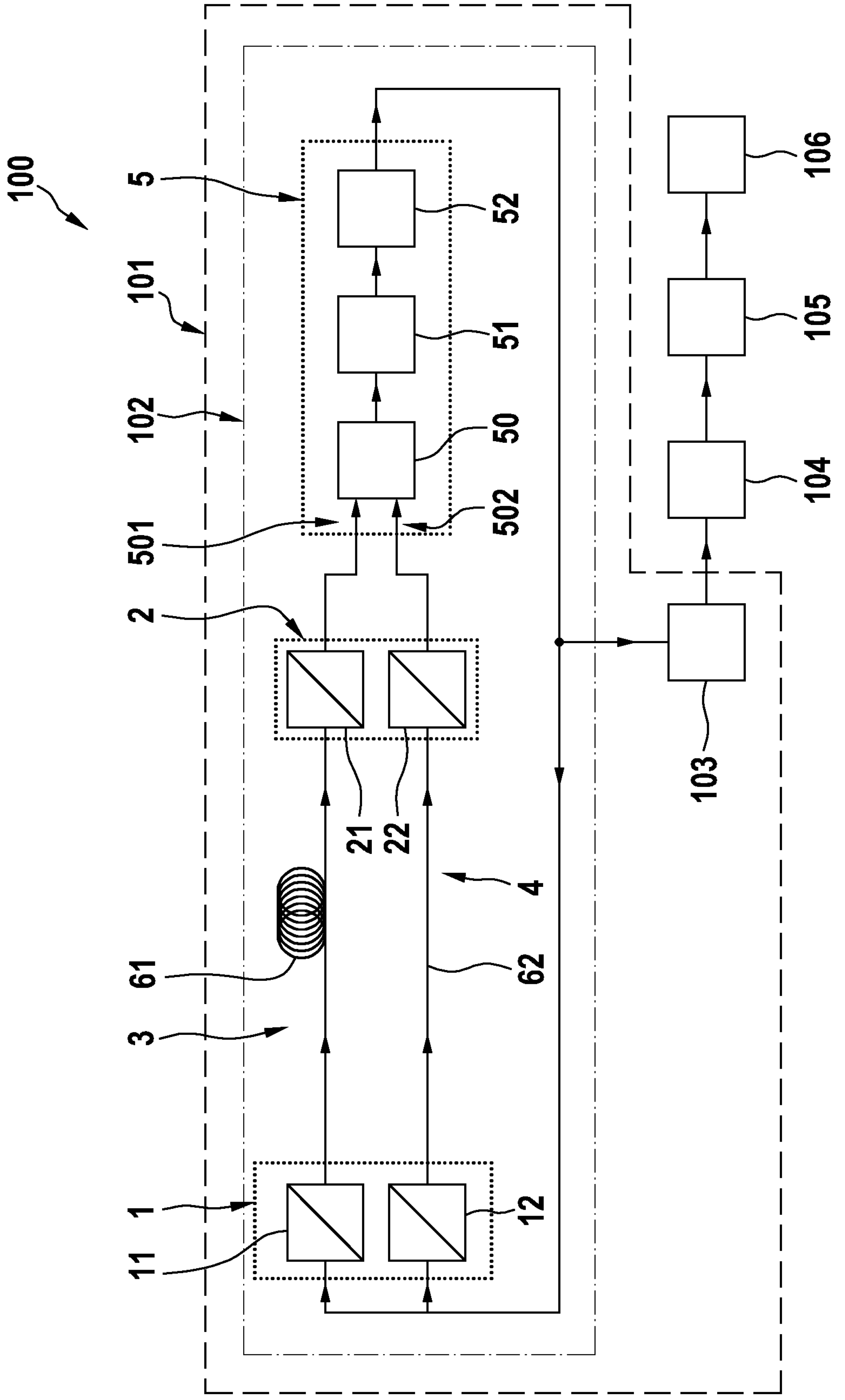
FIG. 6 is a simplified schematic view of a region of a time-measuring device according to a third embodiment of the present invention.

FIG. 6 relates to a time-measuring device 100 configured as a timepiece, according to a third embodiment of the invention.

The time-measuring device 100 according to the third embodiment differs from the time-measuring device 100 according to the first embodiment by the following design of the oscillation system 102:

In this case, the electro-optical converter device 1 comprises a first electro-optical converter 11 and second electro-optical converter 12. The first electro-optical converter 11 is configured for generating a first clocked light signal and the second electro-optical converter 12 is configured for generating a second clocked light signal. The first electro-optical converter 11 can be configured as a semiconductor laser or light-emitting diode. The same also applies for the second electro-optical converter 12. In contrast to the first embodiment, on account of the two mentioned electro-optical converters 11, 12 being provided, the electro-optical converter device 1 does not comprise an optical splitter.

In particular, the first electro-optical converter 11 is configured to feed the first clocked light signal into a first signal path 3, wherein the second electro-optical converter 12 is configured to feed the second clocked light signal into a second signal path 4. The first signal path 3 contains the first waveguide 61. The second signal path 4 comprises a second waveguide 62 which connects the second electro-optical converter 12 to the second opto-electric converter 22. Since this design does not involve temperature compensation, but rather only the elimination of the process duration of the electronic components, the second waveguide 62 is not essential. The second signal path 4 can also directly connect the second electro-optical converter 12 to the second opto-electric converter 22.

In this embodiment of the time-measuring device 100, both the first electro-optical converter 11 and the second electro-optical converter 12 are controlled by means of the control signal, which can be generated by the control device 5.

As already described, providing two electro-optical converters makes it possible to omit an optical splitter, which enables simplification of the design of the oscillation system 102 and thus a reduction in the outlay for producing the overall time-measuring device 100. Furthermore, the first clocked light signal and the second clocked light signal can be easily generated independently of one another.

Figure 7:
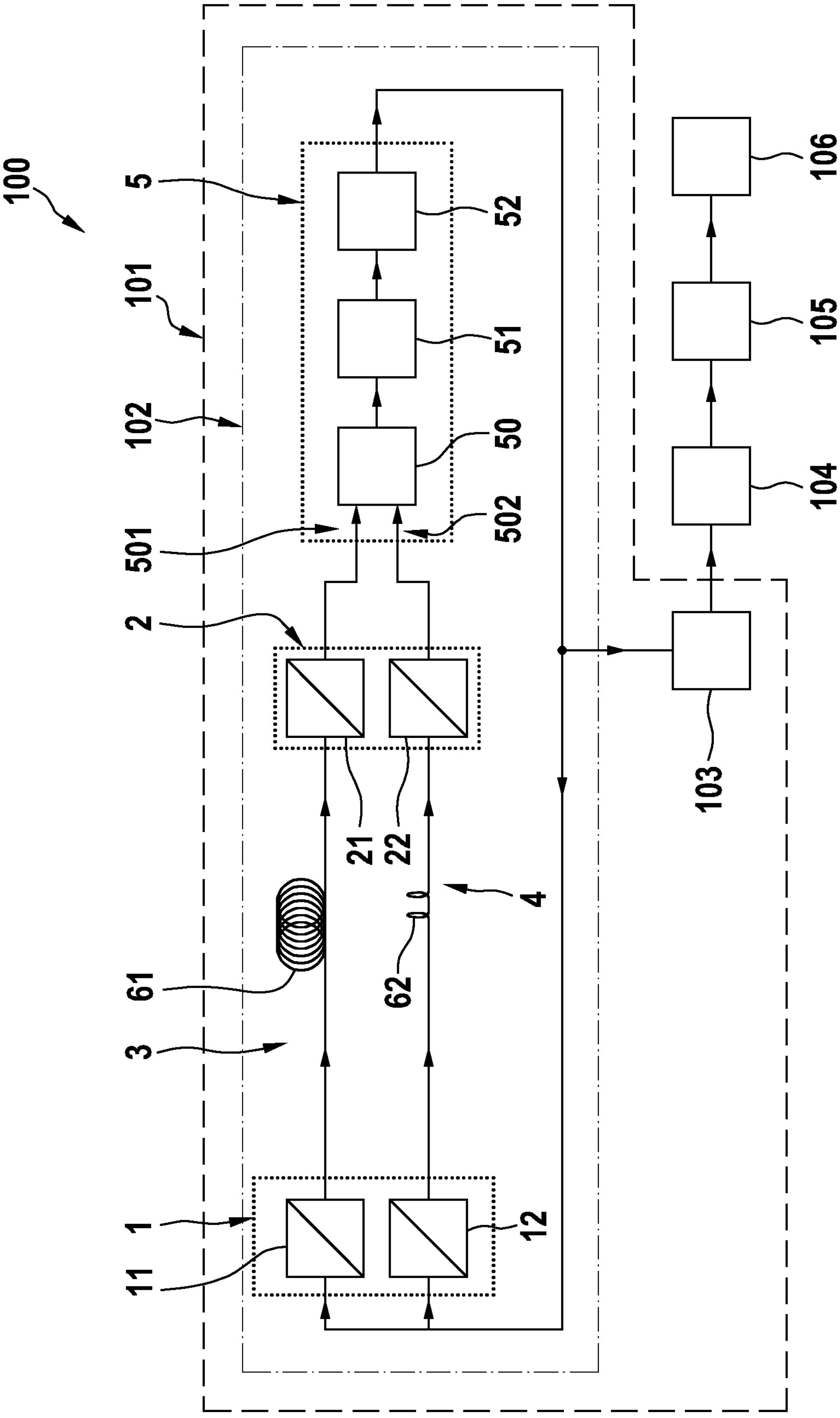
FIG. 7 is a simplified schematic view of a region of a time-measuring device according to a fourth embodiment of the present invention.

FIG. 7 relates to a time-measuring device 100 configured as a timepiece, according to a fourth embodiment of the invention.

The time-measuring device 100 according to the fourth embodiment differs from the time-measuring device 100 according to the third embodiment by the following design of the oscillation system 102:

The first signal path 3 comprises the first waveguide 61, and the second signal path 4 comprises the second waveguide 62. The first waveguide 61 and the second waveguide 62 are configured in such a way that, on the one hand, a transit time of the first clocked light signal in the first waveguide 61 and a transit time of the second clocked light signal in the second waveguide 62, at a predetermined temperature, are different from one another, and that, on the other hand, the first waveguide 61 and the second waveguide 62 are configured such that a change in the transit time of the first clocked light signal in the first waveguide 61 in the case of a predetermined temperature deviation from the predetermined temperature is the same as a change in the transit time of the second clocked light signal in the second waveguide 62 in the case of the same predetermined temperature deviation.

For this purpose, the material through which light can stream, and/or the length, and/or the cross-sectional design of the first waveguide 61 and/or of the second waveguide 62 can be selected accordingly. In this case, the second waveguide 62 is shorter than the first waveguide 61. In this case, the first waveguide 61 is preferably at least 3 times, preferably at least 10 times, more preferably at least 30 times, longer than the waveguide of the second waveguide 62.

In particular, the first waveguide 61 can be configured as a hollow-core fiber, wherein the second waveguide 62 can be configured as a solid-core fiber, in particular as a monomodal fiber or multimode fiber. In this case, a ratio of the expansion coefficient of the first waveguide 61 to the expansion coefficient of the second waveguide 62 can be between 1:30 and 1:4, in particular 1:16.

The time-measuring device 100 according to the fourth embodiment has the advantage that a temperature change of the first waveguide 61, which brings about a change in the original length and a refractive index of the first waveguide 61, can be compensated. In particular, for this purpose a temperature sensor can be omitted, as a result of which possible measurement inaccuracies can be eliminated.

Figure 8:
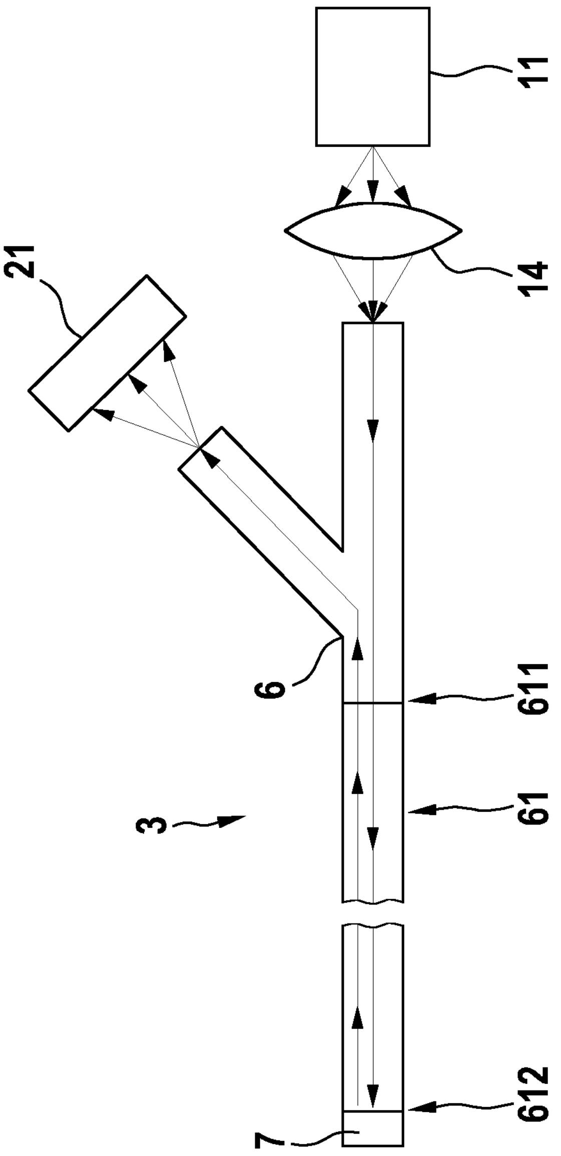
FIG. 8 is a simplified schematic view of a region of a time-measuring device according to a fifth embodiment of the present invention.

FIG. 8 relates to a time-measuring device 100 configured as a timepiece, according to a fifth embodiment of the invention.

The time-measuring device 100 according to the fifth embodiment differs from that according to the third or fourth embodiment essentially by the design of the oscillation system 102, in particular the region thereof that comprises the first signal path 3.

As can be seen from FIG. 8, the electro-optical converter device 1 comprises, in addition to the first electro-optical converter 11, a lens 14, which is arranged after the first electro-optical converter 11, in a direction from the first electro-optical converter 11 to the first waveguide 61. The lens 14 is in particular configured as a convex lens, and serves to refract the light, which is emitted from the first electro-optical converter 11 in different directions, in such a way that the light rays are collimated after the lens 14. In other words, the lens 14 is configured to collimate divergent light of the first electro-optical converter 11. In FIG. 8, the lens 14 is shown as a single lens element. However, it is also possible for the lens 14 to be configured as an optical system comprising at least two lens elements.

An optical splitter 6 is arranged at a first end of the first waveguide 61, which, within the context of the invention, is referred to as the infeed end 611. In particular, the optical splitter 6 is positioned between the first waveguide 61 and the lens 14. In this case, the optical splitter 6 is configured as a fiber splitter.

A reflector 7 is arranged at a second end of the first waveguide 61, which, within the context of the invention, is referred to as the reflector end 612. Light which is fed into the first waveguide 61 and the infeed end 611 and emerges from the first waveguide 61 at the reflector end 612 can be reflected back into the first waveguide 61 by the reflector 7.

For this purpose, in particular a concave mirror can be used as the reflector 7. In this case, the concave mirror is configured to re-collimate divergent light emerging from the first waveguide 61. In particular, the concave mirror can be a spherical concave mirror. However, it is also possible for the reflector 7 to be a different type of mirror, which is suitable in particular for reflecting back the light beam emerging from the reflector end 612.

In this embodiment, the first signal path 3 comprises the first waveguide 61, the optical splitter 6, the reflector 7, and the first opto-electric converter 21.

In the direction from the first electro-optical converter 11 to the first waveguide 61, in particular to the infeed end 611 of the first waveguide 61, the optical splitter 6 is configured so as to allow the first light signal to pass through, wherein in the direction from the first waveguide 61, in particular from the reflector end 612 of the first waveguide 61, to the first electro-optical converter 11, the optical splitter 6 is configured to outcouple the reflected first light signal 6 into the first opto-electric converter 21.

During operation of the time-measuring device 100, the first electro-optical converter 11 feeds the first clocked light signal into the first waveguide 61, via the lens 14 and the optical splitter 6. The first light signal is reflected back by the reflector 7, at the reflector end 612, into the first waveguide 61, and outcoupled into the first opto-electric converter 21 by means of the optical splitter 6. That is to say that the optical splitter 6 per se acts for the reflected first clocked light signal, i.e., when the light in the first waveguide 61 streams in the direction from the reflector 7 to the optical splitter 6.

The first opto-electric converter 21 converts the first light signal into the first electrical signal, which then, as already described above, is transferred to the phase comparator 50 of the control device 5, in particular to the first input 501 of the phase comparator 50.

The time-measuring device 100 according to the fifth embodiment provides the advantage that, in this case, the light path, i.e., the path that the first clocked light signal travels in the first waveguide 61, is twice the length of the first waveguide 61. Thus, the light path of the first light signal can double, while the length of the first waveguide 61 remains the same, which enables increased accuracy of the clocking of the time-measuring device 100. Alternatively, the length of the first waveguide 61 can halve, while the light path of the first light signal remains the same, which saves space in the time-measuring device 100 and halves the investment in the first waveguide 61, i.e., requires less outlay.

Figure 9:
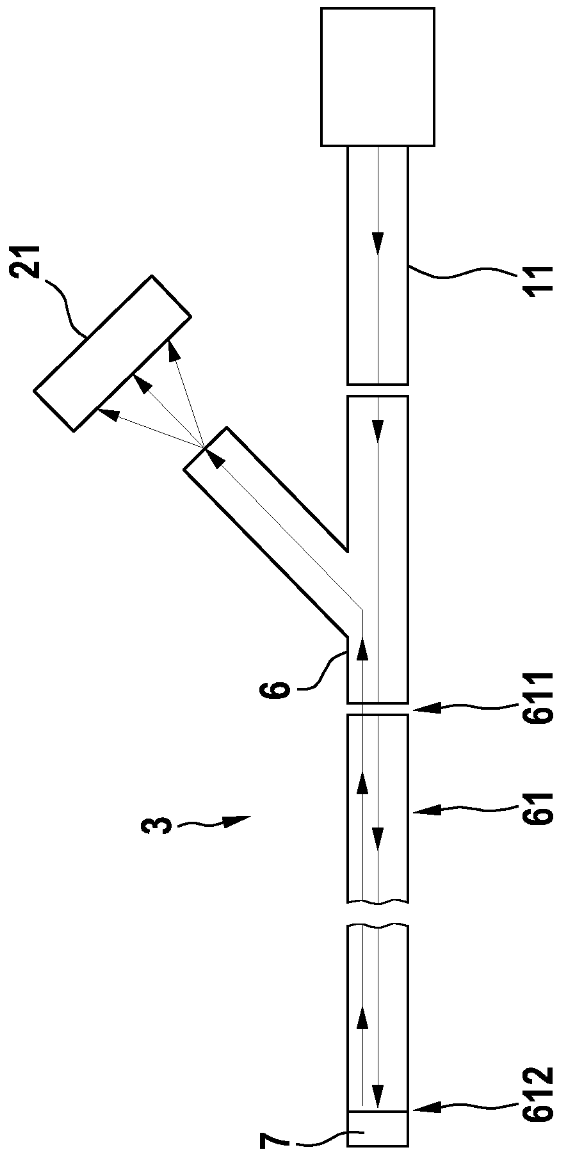
FIG. 9 is a simplified schematic view of a region of a time-measuring device according to a sixth embodiment of the present invention.

FIG. 9 relates to a time-measuring device 100 configured as a timepiece, according to a sixth embodiment of the invention.

The time-measuring device 100 according to the sixth embodiment differs from that according to the fifth embodiment essentially in the design of the first electro-optical converter 11.

In this case, the first electro-optical converter 11 is configured as a pigtail semiconductor laser or pigtail light-emitting diode. As a result, in the case of the time-measuring device 100 according to the sixth embodiment, the lens 14, which is provided in the time-measuring device 100 according to the fifth embodiment, can be omitted.

Figure 10:
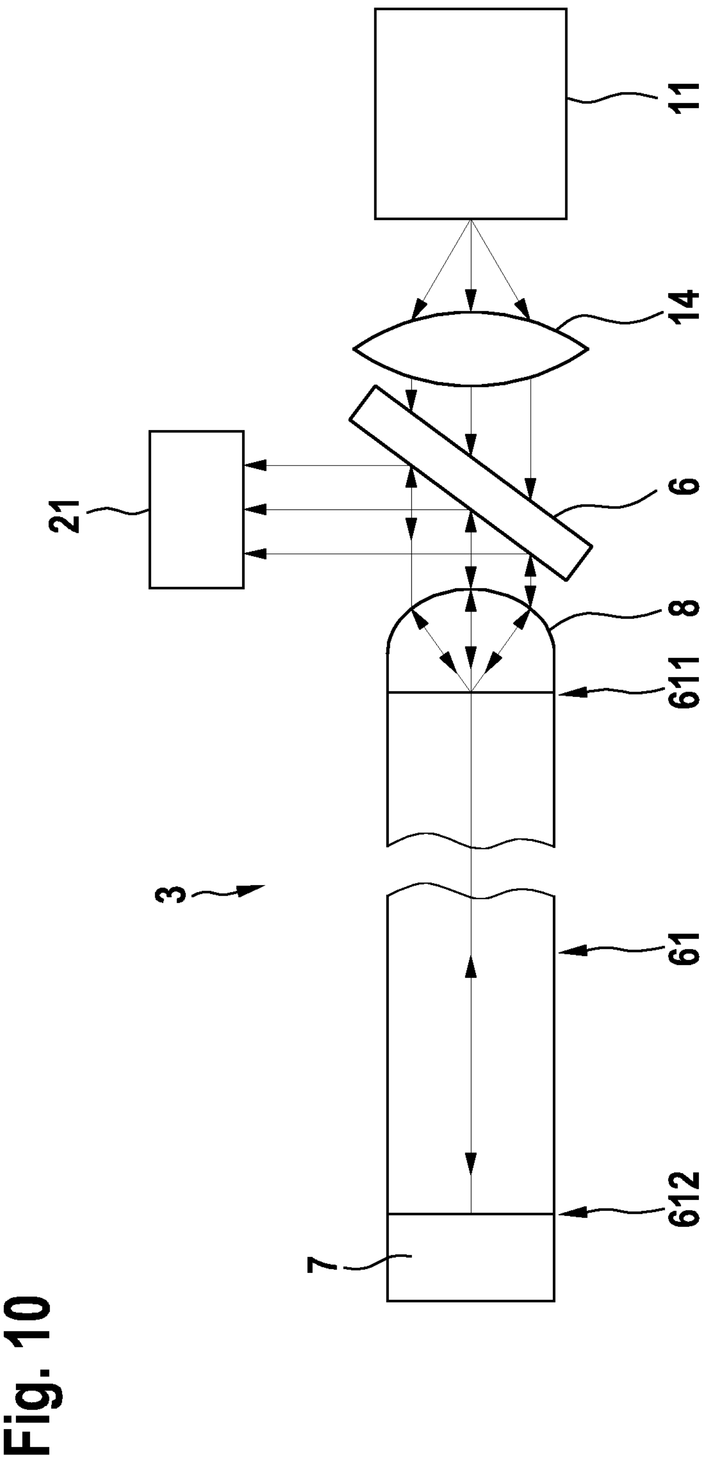
FIG. 10 is a simplified schematic view of a region of a time-measuring device according to a seventh embodiment of the present invention.

FIG. 10 relates to a time-measuring device 100 configured as a timepiece, according to a seventh embodiment of the invention.

The time-measuring device 100 according to the seventh embodiment differs from that according to the fifth embodiment essentially by the design of the oscillation system 102, in particular the region thereof that comprises the first signal path 3.

In the case of the time-measuring device 100 according to the seventh embodiment, a feed lens 8 is attached directly on the infeed end 611 of the first waveguide 61. The feed lens 8 is configured to collimate light entering the first waveguide 61.

The optical splitter 6 is arranged between the feed lens 8 and the lens 14. In particular, the optical splitter 6 is configured as a partially transparent mirror and serves for outcoupling the reflected first clocked light signal into the first opto-electric converter 21. That is to say that, in the direction from the first waveguide 61, in particular to the infeed end 611 of the first waveguide 61, to the first electro-optical converter 11, the optical splitter 6 is configured to outcouple the reflected first clocked light signal into the first opto-electric converter 21. The outcoupling of the first clocked light signal reflected by the reflector 7 takes place in that said light signal is reflected by the partially transparent mirror to the first opto-electric converter 21. In the direction from the first electro-optical converter 11 to the first waveguide 61, in particular to the infeed end 611 of the first waveguide 61, the optical splitter 6 allows the first light signal, generated by the first electro-optical converter 11, to pass through.

During operation of the time-measuring device 100, the first light signal, which the first electro-optical converter 11 generates, is fed into the first waveguide 61, via the lens 14, the optical splitter 6 and the feed lens 8.

At the reflector end 612 of the first waveguide 61 the first light signal is reflected back by the reflector 7 into the first waveguide 61, and fed via the feed lens 8 and the optical splitter 6 into the first opto-electric converter 21. The first opto-electric converter 21 converts the first light signal into the electrical signal, which is then is conducted to the first input 501 of the phase comparator 50 of the control device 5.

Figure 11:
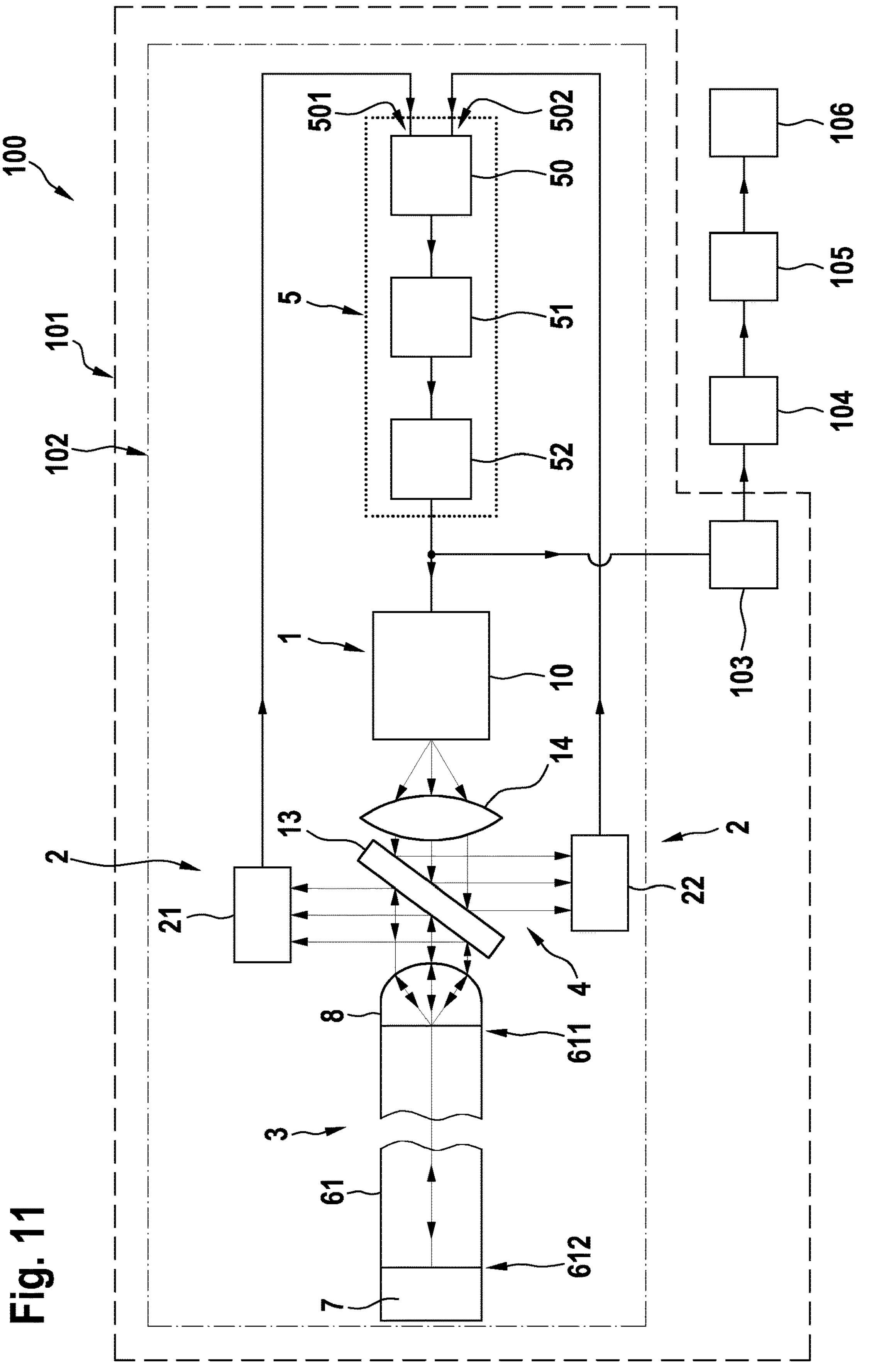
FIG. 11 is a simplified schematic view of a region of a time-measuring device according to an eighth embodiment of the present invention.

FIG. 11 relates to a time-measuring device 100 configured as a timepiece, according to an eighth embodiment of the invention.

The time-measuring device 100 according to the eighth embodiment differs from that according to the seventh embodiment essentially in that in this case the opto-electric converter device 2 comprises a single electro-optical converter 10, and that the time-measuring device 100 comprises a single waveguide 61 and an optical splitter 13 for splitting the clocked light signal, generated by the electro-optical converter 10, into the first clocked light signal and the second clocked light signal. Furthermore, the optical splitter 13 is configured for outcoupling the first clocked light signal, reflected by the reflector 7, into the first opto-electric converter 21. That is to say that the optical splitter 13 has two functions, specifically a splitting function and an outcoupling function.

The optical splitter 13 is in particular configured as a partially transparent mirror and is arranged between the feed lens 8 and the lens 14. Furthermore, the second opto-electric converter 22 is arranged such that the portion of the light generated by the single electro-optical converter 10, which is reflected by the partially transparent mirror that serves as the optical splitter 13, is fed into the second opto-electric converter 22.

In this case, in the context of the invention, the optical splitter 13 can in particular be understood to be part of the electro-optical converter device 1 The light that is reflected at the partially transparent mirror and reaches the second opto-electric converter 22 corresponds to the second clocked light signal. The second signal path 4 thus comprises the second opto-electric converter 22. The first signal path 3 comprises the feed lens 8, the single waveguide 61, the reflector 7, the optical splitter 13, and the first opto-electric converter 21. The light which passes through the partially transparent mirror corresponds to the first clocked light signal.

Figure 12:
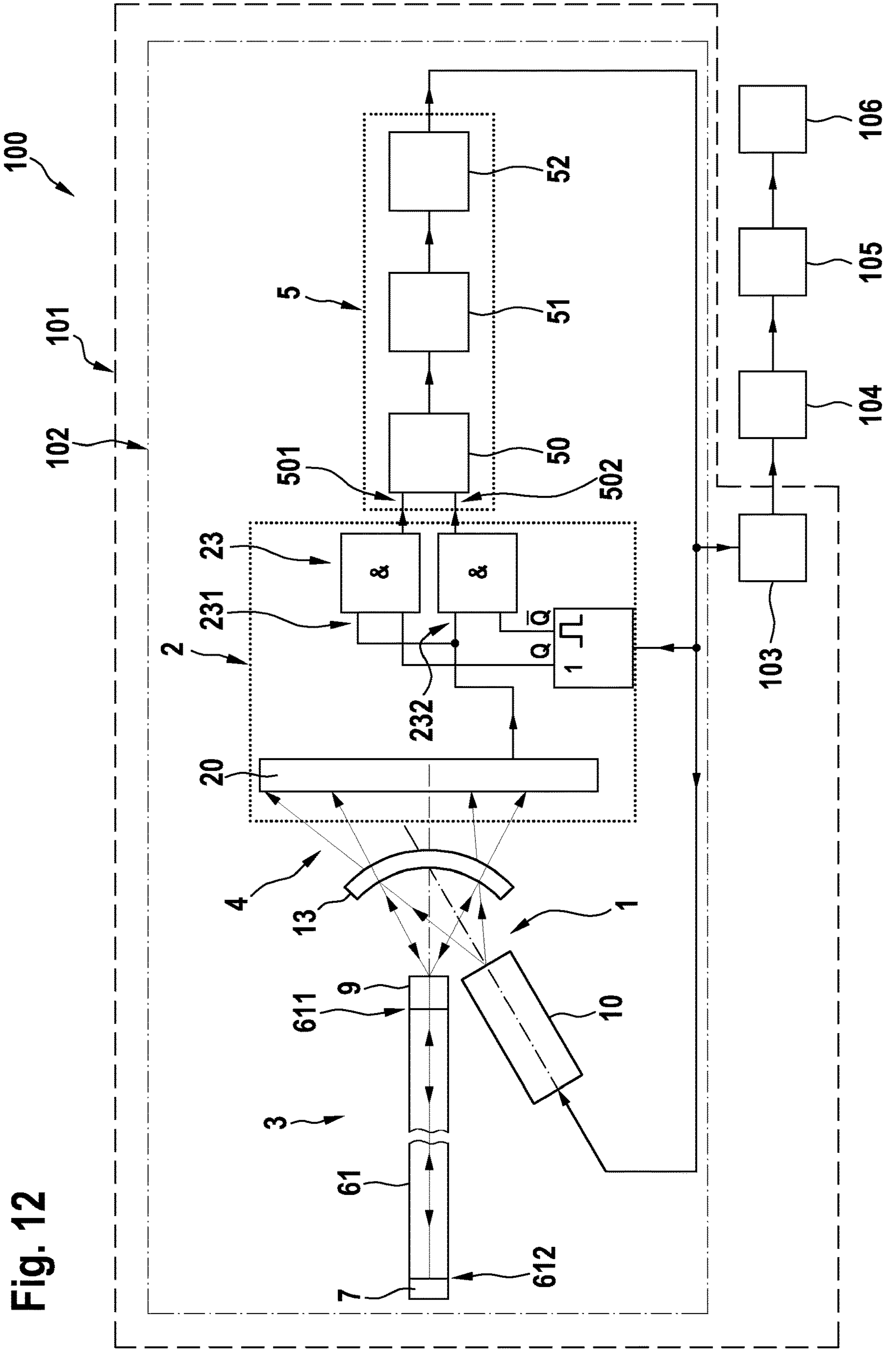
FIG. 12 is a simplified schematic view of a region of a time-measuring device according to a ninth embodiment of the present invention.

FIG. 12 relates to a time-measuring device 100 configured as a timepiece, according to a ninth embodiment of the invention.

The time-measuring device 100 comprises a single electro-optical converter 10 and an optical splitter 13, which form the electro-optical converter device 1, an opto-electric converter device 2 which comprises a single opto-electric converter 20 and a signal splitter 23, a single waveguide 61, a reflector 7, and a feed window 9.

The reflector 7 is arranged directly at a reflector end 612 of the waveguide 61, and is advantageously configured as a plane mirror. For this purpose, an end cap can advantageously be arranged directly on the reflector end 612 of the waveguide 61, the inner surface of which end cap, i.e., the surface of the end cap facing the reflector end 612 of the waveguide 61, is mirrored. This can make it possible that little or no light is lost after the reflection.

The feed window 9 is arranged directly at an infeed end 611 of the waveguide 61. An end cap, which is configured to let in light, can be used as the feed window 9. In this case, the optical splitter 13 is configured as a partially transparent mirror, in particular partially transparent concave mirror, and can be arranged after the electro-optical converter 10, in the direction from the electro-optical converter 10 to the waveguide 61. Thus, a first portion of the light which is emitted by the electro-optical converter 10 is reflected and collimated by the partially transparent concave mirror, and fed into the waveguide 61 via the feed window 9. The partially transparent concave mirror can also be referred to as semi-transparent focusing mirror. This portion of the light corresponds to the first clocked light signal. A second portion of the light which is emitted by the electro-optical converter 10 passes through the semi-transparent mirror and is fed into the opto-electric converter 20. The second portion of the light corresponds to the second clocked light signal. As can be seen from FIG. 12, a concave surface of the partially transparent concave mirror faces the electro-optical converter 10.

The first clocked light signal and the second light signal are acquired by the opto-electric converter 20 at different times, since the two light signals travel over paths of different lengths and are thus temporally offset. The opto-electric converter device 20 generates the first electrical signal based on the first clocked light signal, and the second electrical signal based on the second clocked light signal. The first electrical signal and the second electrical signal are also temporally offset signals. During operation of the time-measuring device 100, the first clocked light signal and the second clocked light signal form a superimposition signal. Thus, in other worse, the opto-electric converter 20 is configured to generate the superimposition signal formed from the first clocked light signal and the second clocked light signal.

However, in order to be able to distinguish the two electrical signals from one another, owing to the fact that both the first electrical signal and the second electrical signal are generated by the same opto-electric converter 20, the above-mentioned signal splitter 23 is provided. Specifically, the signal splitter 23 is configured to split the first electrical signal and the second electrical signal from one another or to hold them apart, such that said signals can be conducted to the control device 5, in particular to the first input 501 and the second input 502, respectively, of the phase comparator 50. In other words, the signal splitter 23 is configured for generating the first electrical signal and the second electrical signal from the superimposition signal.

In this case, the first signal path 3 comprises the waveguide 61, the reflector 7, the optical splitter 13 of the electro-optical converter device 1, the single opto-electric converter 20, and a first signal splitter signal path 231, wherein the second signal path 4 comprises the single opto-electric converter 20 and a second signal splitter signal path 232.

The time-measuring device 100 according to the ninth embodiment in particular has the advantage that only one single waveguide, one single electro-optical converter, and one single opto-electric converter are required.

Figure 13:
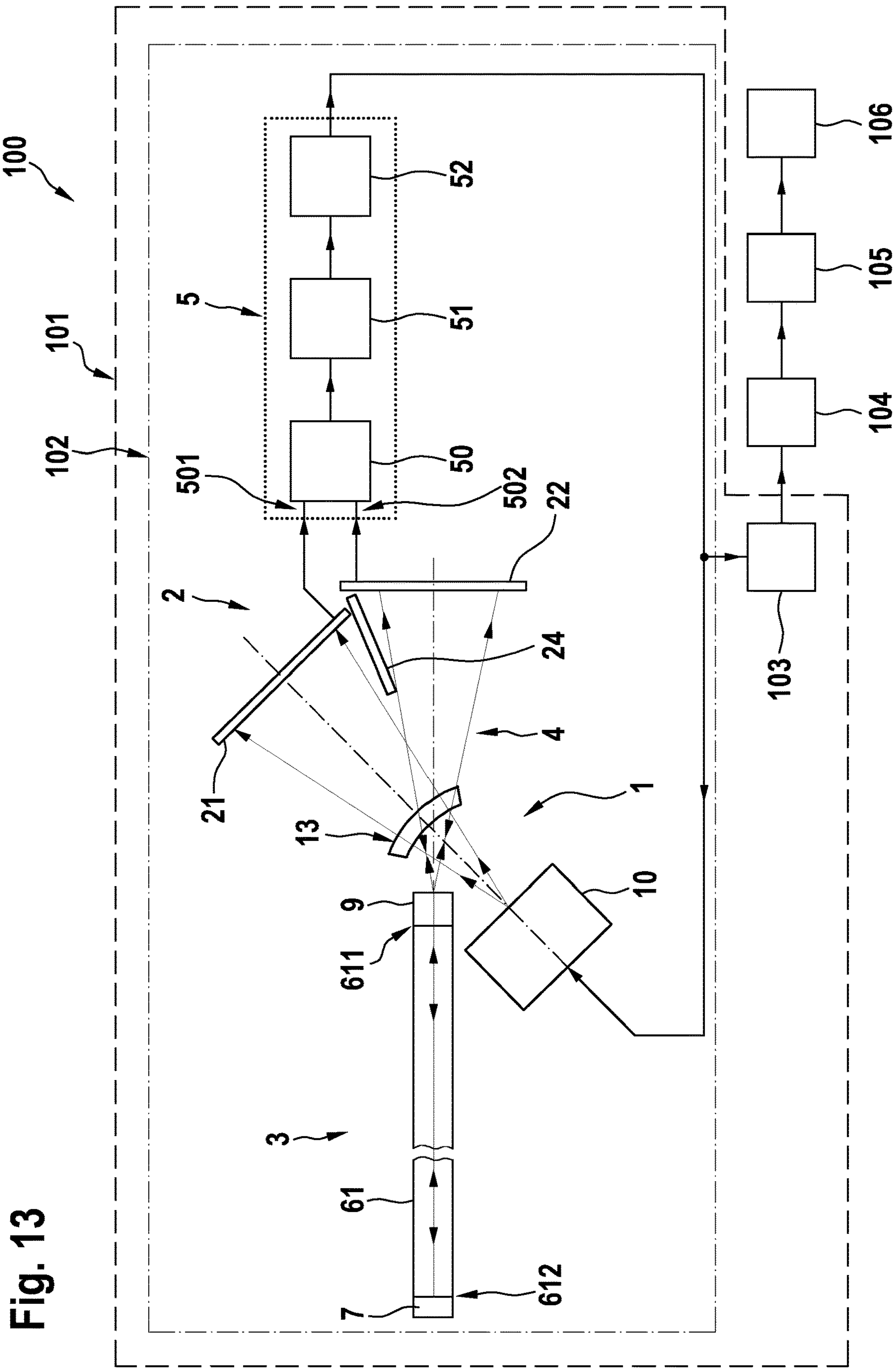
FIG. 13 is a simplified schematic view of a region of a time-measuring device according to a tenth embodiment of the present invention.

FIG. 13 relates to a time-measuring device 100 configured as a timepiece, according to a tenth embodiment of the invention.

The time-measuring device 100 according to the tenth embodiment differs from that according to the ninth embodiment in that in this case the opto-electric converter device 2 comprises a first opto-electric converter 21 for generating the first electrical signal based on the first clocked light signal, and a second opto-electric converter 22 for generating the second electrical signal based on the second clocked light signal.

It is to be understood that the optical splitter 13, configured as a partially transparent mirror, in particular partially transparent concave mirror, is arranged relative to the single waveguide 61 in such a way that the portion of the light signal, generated by the single electro-optical converter 10, which is reflected by the partially transparent mirror and corresponds to the first clocked light signal is fed into the waveguide 61. As can be seen from FIG. 12, a concave surface of the partially transparent concave mirror faces the electro-optical converter 10. Furthermore, the partially transparent mirror, the first opto-electric converter 21 and the second opto-electric converter 22 are arranged relative to one another in such a way that the first clocked light signal reflected by the reflector 7 reaches the first opto-electric converter 21, and the portion of the light signal, generated by the single electro-optical converter 10, which passes through the partially transparent mirror and corresponds to the second clocked light signal, reaches the second opto-electric converter 22.

In order to prevent a portion of the first clocked light signal reaching the second opto-electric converter 22 and a portion of the second clocked light signal reaching the first opto-electric converter 21, a separator 24 is advantageously arranged between the first opto-electric converter 21 and the second opto-electric converter 22. The separator 24 can in particular be part of the opto-electric converter device 2. Advantageously, the separator 24 can be configured as a separating wall.

In this case, the first signal path 3 comprises the waveguide 61, the reflector 7, the optical splitter 13 of the electro-optical converter device 1, and the first opto-electric converter 21, wherein the second signal path 4 comprises the second opto-electric converter 22.

It is noted that, in the described embodiments, a concave mirror or a plane mirror, as described above, can be used as the reflector 7. In particular if the reflector 7 is configured as a plane mirror it is particularly advantageous for this to be arranged directly on the reflector end 612 of the first waveguide 61.

Although the time-measuring devices 100 according to the described embodiments are configured as timepieces, in particular watches, the present invention is also used in other fields of application. For example, the time-measuring devices 100 described above can be used, without the drive device 104, the clockwork 105 and the mechanical clock display device 106, in navigation devices. Instead, a time-measuring device 100 of this kind, also referred to within the context of the present invention as a navigation device time-measuring device, can preferably comprise an application-oriented unit. In particular, the application-oriented unit can be a position determination unit which is configured to determine a position of the navigation device based on the useful signal generated by the useful-signal generating device 103. The application-oriented unit can be implemented as software and/or hardware.

In addition to the above written description of the invention, for the supplementary disclosure thereof reference is hereby explicitly made to the illustrative representation of the invention in FIG. 1 to 13.

The invention claimed is:

1. A timepiece, comprising:

an electro-optical converter device having at least one electro-optical converter, an opto-electric converter device, a first signal path which leads into the opto-electric converter device via a first waveguide, a second signal path which leads into the opto-electric converter device directly or via a second waveguide, a control device, and a signal generating device, wherein:

the electro-optical converter device is configured for feeding a first clocked light signal into the first waveguide and a second clocked light signal into the second signal path, the opto-electric converter device is configured for generating a first electrical signal based on the first clocked light signal, and a second electrical signal based on the second clocked light signal, the first signal path and the second signal path are configured such that a transit time of the first clocked light signal in the first signal path and the transit time of the second clocked light signal in the second signal path are different from one another, the control device is configured to generate a control signal based on the phase difference between the first electrical signal and the second electrical signal, and to actuate the electro-optical converter device, for generating the two light signals, by means of the control signal, the signal generating device is configured for generating a signal that clocks the time, based on a frequency of the control signal, and the timepiece comprises a clock display device for displaying the time based on the signal.

2. The timepiece of claim 1, wherein the control device comprises a phase comparator, a loop filter for integration of an output signal of the phase comparator, and an oscillator which can be actuated by an output signal of the loop filter.

3. The timepiece of claim 2, wherein the actuatable oscillator is a voltage-controlled oscillator or comprises an adjustable piezoelectric oscillating crystal having a trimmer capacitor.

4. The timepiece of of claim 1, wherein the control device is implemented as hardware and/or software.

5. The timepiece of of claim 1, wherein the electro-optical converter device comprises a single electro-optical converter which is configured for generating a clocked light signal, and an optical splitter which is configured for splitting the clocked light signal into the first clocked light signal and the second clocked light signal.

6. The timepiece of of claim 1, wherein the electro-optical converter is a first electro-optical converter and the electro-optical converter device comprises a second electro-optical converter, wherein the first electro-optical converter is configured for generating a first clocked light signal and the second electro-optical converter is configured for generating a second clocked light signal.

7. The timepiece of of claim 1, wherein the opto-electric converter device comprises a single opto-electric converter for generating a superimposition signal formed of the first clocked light signal and the second clocked light signal, and a signal splitter which is configured for generating the first electrical signal and the second electrical signal from a superimposition signal.

8. The timepiece of of claim 7, wherein a reflector is arranged at a reflector end of the first waveguide, by means of which reflector the first clocked light signal can be reflected back into the first waveguide, and wherein the first signal path is configured such that the reflected first clocked light signal can be outcoupled into the opto-electric converter of the first signal path at an infeed end of the first waveguide.

9. The timepiece of claim 8, wherein the first signal path comprises an optical splitter at the infeed end of the first waveguide, which splitter is configured for outcoupling the reflected first clocked light signal into the first opto-electric converter.

10. The timepiece of claim 9, wherein the optical splitter comprises a partially transparent mirror or a fiber splitter.

11. The timepiece of of claim 1, wherein:

the opto-electric converter device comprises a first opto-electric converter and second opto-electric converter, wherein the first signal path comprises the first opto-electric converter and the second signal path comprises the second opto-electric converter, and the first opto-electric converter is configured for generating the first electrical signal based on the first clocked light signal, and the second opto-electric converter is configured for generating the second electrical signal based on the second clocked light signal.

12. The timepiece of claim 11, wherein the first opto-electric converter is configured identically to the second opto-electric converter.

13. The timepiece of of claim 1, wherein the second waveguide is shorter than the first waveguide.

14. The timepiece of claim 13, wherein the first waveguide and the second waveguide are configured in such a way that:

a transit time of the first clocked light signal in the first waveguide and a transit time of the second clocked light signal in the second waveguide, at a predetermined temperature, are different from one another, and a change in the transit time of the first clocked light signal in the first waveguide in the case of a predetermined temperature deviation from the predetermined temperature is the same as a change in the transit time of the second clocked light signal in the second waveguide in the case of the same predetermined temperature deviation.

15. The timepiece of claim 14, wherein the first waveguide and the second waveguide differ in terms of the material through which light can stream, and/or the length, and/or the cross-sectional design.

* * * * *